(12) United States Patent
Fourcand

(10) Patent No.: US 8,289,962 B2
(45) Date of Patent: Oct. 16, 2012

(54) MULTI-COMPONENT COMPATIBLE DATA ARCHITECTURE

(75) Inventor: Serge Francois Fourcand, Fairview, TX (US)

(73) Assignee: Futurewei Technologies, Inc., Plano, TX (US)

( * ) Notice: Subject to any disclaimer, the term of this patent is extended or adjusted under 35 U.S.C. 154(b) by 493 days.

(21) Appl. No.: 12/691,372

(22) Filed: Jan. 21, 2010

(65) Prior Publication Data

US 2010/0135315 A1    Jun. 3, 2010

Related U.S. Application Data

(62) Division of application No. 11/737,803, filed on Apr. 20, 2007, now Pat. No. 7,675,945.

(60) Provisional application No. 60/826,764, filed on Sep. 25, 2006, provisional application No. 60/857,741, filed on Nov. 8, 2006, provisional application No. 60/886,833, filed on Jan. 26, 2007.

(51) Int. Cl.
H04L 12/28    (2006.01)

(52) U.S. Cl. .................. 370/389; 370/358; 370/395.51; 370/420

(58) Field of Classification Search .................. 370/389, 370/358, 359, 386, 391, 395.5, 395.51, 401, 370/402, 411, 420
See application file for complete search history.

(56) References Cited

U.S. PATENT DOCUMENTS

| | | | |
|---|---|---|---|
| 5,303,241 A | 4/1994 | Takada et al. | |
| 5,361,261 A | 11/1994 | Edem et al. | |
| 5,367,524 A | 11/1994 | Rideout, Jr. et al. | |
| 5,434,848 A | 7/1995 | Chimento, Jr. et al. | |
| 5,696,798 A | 12/1997 | Wright et al. | |
| 5,802,051 A | 9/1998 | Petersen et al. | |
| 5,933,607 A | 8/1999 | Tate et al. | |
| 6,049,541 A | 4/2000 | Kerns et al. | |
| 6,233,237 B1 | 5/2001 | Yucebay et al. | |
| 6,272,109 B1 | 8/2001 | Pei et al. | |
| 6,320,877 B1 | 11/2001 | Humphrey et al. | |
| 6,487,169 B1 | 11/2002 | Tada | |
| 6,496,477 B1 | 12/2002 | Perkins et al. | |
| 6,501,810 B1 | 12/2002 | Karim et al. | |

(Continued)

FOREIGN PATENT DOCUMENTS

CN            1293843           5/2001

(Continued)

OTHER PUBLICATIONS

Precise Networked Clock Synchronization Working Group of the IM/ST Committee, IEEE P1588™ D2.2, "Draft Standard for a Precision Clock Synchronization Protocol for Networked Measurement and Control Systems," 2007, 305 pages, IEEE Standards Activities Department, Piscataway, NJ.

(Continued)

*Primary Examiner* — Brenda H Pham
(74) *Attorney, Agent, or Firm* — Conley Rose, P.C..; Grant Rodolph; Rayhao Chung

(57) ABSTRACT

A backbone network, comprising a first switch comprising a first port configured to communicate a data stream via an Ethernet interface, and a second port configured to communicate the data stream via a SONET/SDH interface, and a second switch comprising a third port configured to receive the data stream from the first switch via the Ethernet interface, wherein the first switch and the second switch are synchronized.

20 Claims, 17 Drawing Sheets

U.S. PATENT DOCUMENTS

| | | |
|---|---|---|
| 6,570,890 B1 | 5/2003 | Keenan et al. |
| 6,577,631 B1 | 6/2003 | Keenan et al. |
| 6,633,566 B1 | 10/2003 | Pierson, Jr. |
| 6,674,750 B1 | 1/2004 | Castellano |
| 6,674,756 B1 | 1/2004 | Rao et al. |
| 6,754,206 B1 | 6/2004 | Nattkemper et al. |
| 6,771,614 B1 | 8/2004 | Jones, IV et al. |
| 6,816,500 B1 | 11/2004 | Mannette et al. |
| 6,847,644 B1 | 1/2005 | Jha |
| 6,859,458 B2 | 2/2005 | Yuang et al. |
| 6,868,093 B1 | 3/2005 | Bohm et al. |
| 6,874,048 B2 | 3/2005 | Knapp et al. |
| 6,944,163 B2 | 9/2005 | Bottorff et al. |
| 6,959,151 B1 | 10/2005 | Cotter et al. |
| 6,985,497 B2 | 1/2006 | Hsu et al. |
| 6,985,499 B2 | 1/2006 | Elliot |
| 6,999,479 B1 | 2/2006 | Jha |
| 7,007,099 B1 | 2/2006 | Donati et al. |
| 7,031,341 B2 | 4/2006 | Yu |
| 7,089,485 B2 | 8/2006 | Azadet et al. |
| 7,103,124 B1 | 9/2006 | Lindskog et al. |
| 7,139,338 B2 | 11/2006 | Wilson |
| 7,173,927 B2 * | 2/2007 | Kumar et al. .................. 370/352 |
| 7,188,189 B2 | 3/2007 | Karol et al. |
| 7,236,126 B2 | 6/2007 | Jeon et al. |
| 7,305,002 B1 | 12/2007 | Ageby et al. |
| 7,403,514 B1 | 7/2008 | Moulsley |
| 7,436,765 B2 | 10/2008 | Sisto et al. |
| 7,453,885 B2 | 11/2008 | Rogers |
| 7,463,709 B2 | 12/2008 | Raphaeli et al. |
| 7,496,112 B1 | 2/2009 | Danielson et al. |
| 7,519,747 B1 | 4/2009 | Cory et al. |
| 7,613,212 B1 * | 11/2009 | Raz et al. ..................... 370/510 |
| 7,646,710 B2 | 1/2010 | Christie, IV |
| 7,986,700 B2 | 7/2011 | Fourcand |
| 2001/0043603 A1 | 11/2001 | Yu |
| 2001/0053130 A1 | 12/2001 | Tanaka et al. |
| 2002/0068593 A1 | 6/2002 | Deltour et al. |
| 2002/0087716 A1 | 7/2002 | Mustafa |
| 2002/0131425 A1 | 9/2002 | Shalom |
| 2002/0163926 A1 | 11/2002 | Moharram |
| 2002/0176389 A1 | 11/2002 | Colombo |
| 2003/0095568 A1 | 5/2003 | Tominaga et al. |
| 2003/0117899 A1 | 6/2003 | Eidson |
| 2003/0147348 A1 | 8/2003 | Jiang |
| 2003/0161307 A1 | 8/2003 | Lo |
| 2003/0174700 A1 | 9/2003 | Ofek et al. |
| 2003/0179755 A1 | 9/2003 | Fraser |
| 2003/0219042 A1 | 11/2003 | Tosa |
| 2004/0001483 A1 | 1/2004 | Schmidt et al. |
| 2004/0001502 A1 | 1/2004 | Garmire et al. |
| 2004/0028408 A1 | 2/2004 | Cox et al. |
| 2004/0047367 A1 | 3/2004 | Mammen |
| 2004/0062265 A1 | 4/2004 | Poledna |
| 2004/0062278 A1 * | 4/2004 | Hadzic et al. .................. 370/503 |
| 2004/0063401 A1 | 4/2004 | Meckelburg et al. |
| 2004/0066775 A1 | 4/2004 | Grovenburg |
| 2004/0071166 A1 | 4/2004 | Yen et al. |
| 2004/0076166 A1 | 4/2004 | Patenaude |
| 2004/0120438 A1 | 6/2004 | Forte |
| 2004/0151125 A1 | 8/2004 | Holmeide et al. |
| 2004/0177162 A1 | 9/2004 | Wetzel et al. |
| 2004/0179551 A1 | 9/2004 | Lentine et al. |
| 2004/0208554 A1 * | 10/2004 | Wakai et al. ..................... 398/54 |
| 2004/0213149 A1 | 10/2004 | Mascolo |
| 2004/0252688 A1 | 12/2004 | May et al. |
| 2005/0099988 A1 | 5/2005 | Wang et al. |
| 2005/0117576 A1 | 6/2005 | McDysan et al. |
| 2005/0129028 A1 | 6/2005 | Peeters et al. |
| 2005/0141568 A1 | 6/2005 | Kwak et al. |
| 2005/0175013 A1 | 8/2005 | Le Pennec et al. |
| 2005/0190796 A1 | 9/2005 | Date et al. |
| 2005/0254484 A1 | 11/2005 | Barzegar et al. |
| 2005/0278457 A1 | 12/2005 | Hall et al. |
| 2005/0281217 A1 | 12/2005 | Mottier |
| 2006/0015507 A1 | 1/2006 | Butterworth et al. |
| 2006/0092985 A1 | 5/2006 | Cho et al. |
| 2006/0104302 A1 | 5/2006 | Cho et al. |
| 2006/0109864 A1 | 5/2006 | Oksman |
| 2006/0123126 A1 | 6/2006 | Kim et al. |
| 2006/0176905 A1 | 8/2006 | Liu et al. |
| 2006/0182144 A1 | 8/2006 | Dove et al. |
| 2006/0233116 A1 | 10/2006 | Kyusojin et al. |
| 2006/0239300 A1 | 10/2006 | Hannel et al. |
| 2006/0256768 A1 | 11/2006 | Chan |
| 2006/0274791 A1 | 12/2006 | Garcia et al. |
| 2007/0008958 A1 | 1/2007 | Clemm et al. |
| 2007/0022209 A1 | 1/2007 | Delvai et al. |
| 2007/0064587 A1 | 3/2007 | Langley et al. |
| 2007/0076605 A1 | 4/2007 | Cidon et al. |
| 2007/0097926 A1 | 5/2007 | Liu et al. |
| 2007/0121661 A1 | 5/2007 | Ohta et al. |
| 2007/0140127 A1 | 6/2007 | Frei |
| 2007/0192515 A1 | 8/2007 | Kraus |
| 2007/0201365 A1 | 8/2007 | Skoog et al. |
| 2007/0206602 A1 | 9/2007 | Halabi et al. |
| 2007/0206603 A1 | 9/2007 | Weich et al. |
| 2007/0206709 A1 | 9/2007 | Kermosh et al. |
| 2007/0211720 A1 | 9/2007 | Fuchs et al. |
| 2007/0211750 A1 | 9/2007 | Li et al. |
| 2007/0297375 A1 | 12/2007 | Bonta et al. |
| 2007/0299987 A1 | 12/2007 | Parker et al. |
| 2008/0031136 A1 | 2/2008 | Gavette et al. |
| 2008/0043732 A1 | 2/2008 | Desai et al. |
| 2008/0071924 A1 | 3/2008 | Chilukoor |
| 2008/0074996 A1 | 3/2008 | Fourcand |
| 2008/0075002 A1 | 3/2008 | Fourcand |
| 2008/0075069 A1 | 3/2008 | Fourcand |
| 2008/0075110 A1 | 3/2008 | Fourcand |
| 2008/0075120 A1 | 3/2008 | Fourcand |
| 2008/0075121 A1 | 3/2008 | Fourcand |
| 2008/0075122 A1 | 3/2008 | Fourcand |
| 2008/0075123 A1 | 3/2008 | Fourcand |
| 2008/0075124 A1 | 3/2008 | Fourcand |
| 2008/0075127 A1 | 3/2008 | Fourcand |
| 2008/0075128 A1 | 3/2008 | Fourcand |
| 2008/0123541 A1 | 5/2008 | Dielissen et al. |
| 2008/0137675 A1 | 6/2008 | Pauwels |
| 2008/0181114 A1 | 7/2008 | Fourcand |
| 2009/0168797 A1 | 7/2009 | Danielson et al. |
| 2009/0254685 A1 | 10/2009 | Diepstraten et al. |
| 2009/0274172 A1 | 11/2009 | Shen et al. |
| 2010/0135314 A1 | 6/2010 | Fourcand |
| 2010/0284421 A1 | 11/2010 | Fourcand |
| 2010/0316069 A1 | 12/2010 | Fourcand |
| 2011/0255402 A1 | 10/2011 | Fourcand |

FOREIGN PATENT DOCUMENTS

| | | |
|---|---|---|
| CN | 1352841 A1 | 6/2002 |
| CN | 1512683 A | 7/2004 |
| CN | 1516463 A | 7/2004 |
| CN | 1522077 | 8/2004 |
| CN | 1522510 A | 8/2004 |
| CN | 1529471 A | 9/2004 |
| CN | 1571348 | 1/2005 |
| CN | 1575568 A | 2/2005 |
| CN | 1710828 | 12/2005 |
| CN | 1728720 A | 2/2006 |
| CN | 1767499 | 5/2006 |
| CN | 1770673 | 5/2006 |
| CN | 1773887 | 5/2006 |
| CN | 1788501 A | 6/2006 |
| CN | 1855935 | 11/2006 |
| EP | 1091529 A | 4/2001 |
| EP | 1655885 | 5/2006 |
| EP | 1771027 A1 | 4/2007 |
| GB | 2366161 A | 2/2002 |
| JP | 2003188912 A | 7/2003 |
| WO | 9956422 | 11/1999 |
| WO | 02099578 A | 12/2002 |
| WO | 03017543 A1 | 2/2003 |
| WO | 03032539 A1 | 4/2003 |
| WO | 03087984 A2 | 10/2003 |
| WO | 2005101755 A1 | 10/2005 |
| WO | 2006051465 A1 | 5/2006 |
| WO | 2006056415 A1 | 6/2006 |

OTHER PUBLICATIONS

Office Action dated May 12, 2009, 15 pages, U.S. Appl. No. 11/737,800, filed Apr. 20, 2007.
Office Action dated Nov. 23, 2009, 19 pages, U.S. Appl. No. 11/737,800, filed Apr. 20, 2007.
Office Action dated Aug. 7, 2009, 10 pages, U.S. Appl. No. 11/735,590, filed Apr. 16, 2007.
Office Action dated Dec. 30, 2009, 22 pages, U.S. Appl. No. 11/735,590, filed Apr. 16, 2007.
Office Action dated Jun. 9, 2010, 13 pages, U.S. Appl. No. 11/735,590, filed Apr. 16, 2007.
Office Action dated Sep. 23, 2009, 10 pages, U.S. Appl. No. 11/735,591, filed Apr. 16, 2007.
Office Action dated Jan. 6, 2010, 19 pages, U.S. Appl. No. 11/735,591, filed Apr. 16, 2007.
Office Action dated Aug. 5, 2009, 21 pages, U.S. Appl. No. 11/739,316, filed Apr. 27, 2007.
Office Action dated Mar. 25, 2010, 22 pages, U.S. Appl. No. 11/739,316, filed Apr. 27, 2007.
Notice of Allowance dated Aug. 19, 2010, 16 pages, U.S. Appl. No. 11/739,316, filed Apr. 27, 2007.
Office Action dated Feb. 26, 2010, 22 pages, U.S. Appl. No. 11/971,386, filed Jan. 9, 2008.
Office Action dated Sep. 2, 2009, 13 pages, U.S. Appl. No. 11/735,592, filed Apr. 16, 2007.
Office Action dated Feb. 18, 2010, 22 pages, U.S. Appl. No. 11/735,592, filed Apr. 16, 2007.
Office Action dated Aug. 4, 2010, 9 pages, U.S. Appl. No. 11/735,592, filed Apr. 16, 2007.
Office Action dated Sep. 3, 2009, 15 pages, U.S. Appl. No. 11/735,596, filed Apr. 16, 2007.
Office Action dated Feb. 2, 2010, 23 pages, U.S. Appl. No. 11/735,596, filed Apr. 16, 2007.
Office Action dated Sep. 30, 2009, 9 pages, U.S. Appl. No. 11/735,598, filed Apr. 16, 2007.
Office Action dated Feb. 17, 2010, 23 pages, U.S. Appl. No. 11/735,598, filed Apr. 16, 2007.
Notice of Allowance dated Jun. 1, 2010, 8 pages, U.S. Appl. No. 11/735,598, filed Apr. 16, 2007.
Notice of Allowance dated Aug. 24, 2010, 14 pages, U.S. Appl. No. 11/735,598, filed Apr. 16, 2007.
Office Action dated Sep. 18, 2009, 13 pages, U.S. Appl. No. 11/735,602, filed Apr. 16, 2007.
Office Action dated Feb. 22, 2010, 21 pages, U.S. Appl. No. 11/735,602, filed Apr. 16, 2007.
Office Action dated Jul. 29, 2010 15 pages, U.S. Appl. No. 11/735,602, filed Apr. 16, 2007.
Office Action dated Sep. 15, 2009, 13 pages, U.S. Appl. No. 11/735,604, filed Apr. 16, 2007.
Office Action dated Feb. 17, 2010, 24 pages, U.S. Appl. No. 11/735,604, filed Apr. 16, 2007.
Office Action dated Jul. 29, 2010, 15 pages, U.S. Appl. No. 11/735,604, filed Apr. 16, 2007.
Office Action dated Oct. 29, 2009, 9 pages, U.S. Appl. No. 11/735,605.
Office Action dated Mar. 3, 2010, 20 pages, U.S. Appl. No. 11/735,605.
Office Action dated Jun. 22, 2010, 18 pages, U.S. Appl. No. 11/735,605.
Foreign Communication From a Related Counterpart Application—International Search Report and Written Opinion, PCT/CN2008/070046, Apr. 17, 2008, 6 pages.
Foreign Communication From a Related Counterpart Application—International Search Report and Written Opinion, PCT/CN2008/070183, May 8, 2008, 11 pages.
Foreign Communication From a Related Counterpart Application—International Search Report and Written Opinion, PCT/CN2008/070632, Jul. 10, 2008, 5 pages.
Foreign Communication From a Related Counterpart Application—International Search Report and Written Opinion, PCT/CN2008/070630, Jul. 3, 2008, 8 pages.
Foreign Communication From a Related Counterpart Application—International Search Report and Written Opinion, PCT/CN2008/070690, Jul. 17, 2008, 7 pages.
Foreign Communication From a Related Counterpart Application—International Search Report and Written Opinion, PCT/CN2008/070717, Jul. 24, 2008, 10 pages.
Foreign Communication From a Related Counterpart Application—International Search Report and Written Opinion, PCT/CN2008/070017, Apr. 3, 2008, 6 pages.
Foreign Communication From a Related Counterpart Application—International Search Report and Written Opinion, PCT/CN2008/070005, Apr. 10, 2008, 9 pages.
Foreign Communication From a Related Counterpart Application—International Search Report and Written Opinion, PCT/CN2008/070007, Apr. 17, 2008, 8 pages.
Foreign Communication From a Related Counterpart Application—European Search Report, EP Application 08700032.9, Dec. 2, 2009, 7 pages.
Office Action dated Jan. 11, 2011, 10 pages, U.S. Appl. No. 11/735,590, filed Apr. 16, 2007.
Office Action dated Feb. 1, 2011, 10 pages, U.S. Appl. No. 11/735,590, filed Apr. 16, 2007.
Office Action dated Jan. 13, 2011, 10 pages, U.S. Appl. No. 11/735,591, filed Apr. 16, 2007.
Notice of Allowance dated Jul. 19, 2010, 12 pages, U.S. Appl. No. 11/971,386, filed Jan. 9, 2008.
Office Action dated Jan. 3, 2011, 16 pages, U.S. Appl. No. 11/735,592, filed Apr. 16, 2007.
IEEE Standard for Information Technology—Telecommunications and Information Exchange Between Systems—Local and Metropolitan Area Networks—Specific Requirement Part 3: Carrier Sense Multiple Access with Collision Detection (CSMA/CD) Access Method and Physical Layer Specifications—IEEE Computer Society, IEEE Std. 802.3—2008, Dec. 26, 2008—Section 1.
IEEE Standard for Information Technology—Telecommunications and Information Exchange Between Systems—Local and Metropolitan Area Networks—Specific Requirement Part 3: Carrier Sense Multiple Access with Collision Detection (CSMA/CD) Access Method and Physical Layer Specifications—IEEE Computer Society, IEEE Std. 802.3—2008, Dec. 26, 2008—Section 2.
IEEE Standard for Information Technology—Telecommunications and Information Exchange Between Systems—Local and Metropolitan Area Networks—Specific Requirement Part 3: Carrier Sense Multiple Access with Collision Detection (CSMA/CD) Access Method and Physical Layer Specifications—IEEE Computer Society, IEEE Std. 802.3—2008, Dec. 26, 2008—Section 3.
IEEE Standard for Information Technology—Telecommunications and Information Exchange Between Systems—Local and Metropolitan Area Networks—Specific Requirement Part 3: Carrier Sense Multiple Access with Collision Detection (CSMA/CD) Access Method and Physical Layer Specifications—IEEE Computer Society, IEEE Std. 802.3—2008, Dec. 26, 2008—Section 4.
IEEE Standard for Information Technology—Telecommunications and Information Exchange Between Systems—Local and Metropolitan Area Networks—Specific Requirement Part 3: Carrier Sense Multiple Access with Collision Detection (CSMA/CD) Access Method and Physical Layer Specifications—IEEE Computer Society, IEEE Std. 802.3—2008, Dec. 26, 2008—Section 5.
Krzyanowski, "Lectures on Distributed Systems Clock Synchronization," Rutgers University—CS 417: Distributed Systems, copyright 2000-2009, 14 pages.
Office Action dated Jun. 3, 2011, 8 pages, U.S. Appl. No. 11/735,590, filed Apr. 16, 2007.
Office Action dated Jun. 17, 2011, 12 pages, U.S. Appl. No. 11/735,591, filed Apr. 16, 2007.
Office Action dated Jul. 1, 2011, 10 pages, U.S. Appl. No. 11/737,800, filed Apr. 20, 2007.
Office Action dated Jun. 9, 2011, 17 pages, U.S. Appl. No. 11/735,596, filed Apr. 16, 2007.
Notice of Allowance dated Apr. 11, 2011 7 pages, U.S. Appl. No. 11/735,602, filed Apr. 16, 2007.
Office Action—Notice of Allowance—dated Mar. 17, 2011, 9 pages, U.S. Appl. No. 11/735,605.

Foreign Communication from a counterpart application, Chinese application 200880001140.3, Office Action dated Feb. 9, 2011, 5 pages.

Foreign Communication from a counterpart application, Chinese application 200880001140.3, Partial English Translation Office Action dated Feb. 9, 2011, 7 pages.

Foreign Communication from a counterpart application, Chinese application 200880000770.9, Office Action dated Dec. 14, 2010, 7 pages.

Foreign Communication from a counterpart application, Chinese application 200880000770.9, Partial English Translation Office Action dated Dec. 14, 2010, 6 pages.

Office Action dated Oct. 27, 2010, 14 pages, U.S. Appl. No. 11/735,605.

Office Action dated Jun. 26, 2009, 15 pages, U.S. Appl. No. 11/737,803, filed Apr. 20, 2007.

Office Action—Notice of Allowance—dated Dec. 29, 2009, 16 pages U.S. Appl. No. 11/737,803, filed Apr. 20, 2007.

Foreign Communication From a Related Counterpart Application—International Search Report and Written Opinion, PCT/CN2008/070037, Apr. 17, 2008, 10 pages.

Foreign Communication From a Related Counterpart Application—International Search Report and Written Opinion, PCT/CN2008/070038, Apr. 17, 2008, 6 pages.

Foreign Communication From a Related Counterpart Application—International Search Report and Written Opinion, PCT/CN2008/070045, Apr. 17, 2008, 7 pages.

National Instruments, "Introduction to Distributed Clock Synchronization and the IEEE 1588 Precision Time Protocol," http://zone.ni.com/devzone/cda/tut/p/id/2822, May 14, 2008, pp. 1-4.

Pratt, G., et al., "Distributed Synchronous Clocking," IEEE Transactions on Parallel and Distributed Systems, vol. 6, No. 3, Mar. 1995, pp. 314-328.

Wikipedia, "TTEthernet," http://en.wikipedia.org/wiki/TTEthernet, Retrieved Dec. 22, 2011.

Notice of Allowance dated Jun. 21, 2012, 11 pages, U.S. Appl. No. 11/735,590, filed Apr. 16, 2007.

Office Action dated Mar. 6, 2012, 13 pages, U.S. Appl. No. 11/735,591, filed Apr. 16, 2007.

Office Action dated Nov. 21, 2011, 12 pages, U.S. Appl. No. 11/737,800, filed Apr. 20, 2007.

Office Action dated May 25, 2012, 15 pages, U.S. Appl. No. 11/737,800, filed Apr. 20, 2007.

Office Action dated Jun. 20, 2012, 44 pages, U.S. Appl. No. 13/271,691, filed Oct. 12, 2011.

Office Action dated Aug. 3, 2011, 11 pages, U.S. Appl. No. 11/735,592, filed Apr. 16, 2007.

Office Action dated Jan. 23, 2012, 12 pages, U.S. Appl. No. 11/735,592, filed Apr. 16, 2007.

Office Action dated Oct. 25, 2011, 29 pages, U.S. Appl. No. 11/735,596, filed Apr. 16, 2007.

Foreign Communication From a Related Counterpart Application—European Application No. 08700043.6, Supplementary European Search Report and Written Opinion dated Oct. 29, 2009, 7 pages.

Foreign Communication From a Related Counterpart Application—European Application No. 08700032.9, European Office Action dated Jun. 11, 2012, 10 pages.

Foreign Communication From a Related Counterpart Application, Chinese Application 200880001609.3, Chinese Office Action dated Oct. 28, 2011, 4 pages.

Foreign Communication From a Related Counterpart Application, Chinese Application 200880002509.2, Chinese Office Action dated May 19, 2011, 4 pages.

Foreign Communication From a Related Counterpart Application—European Application No. 08700043.6, European Office Action dated Jul. 20, 2012, 7 pages.

Notice of Allowance dated Aug. 13, 2012, 25 pages, U.S. Appl. No. 11/735,591, filed on Apr. 16, 2007.

Office Action dated Aug. 6, 2012, 25 pages, U.S. Appl. No. 11/735,596 filed on Apr. 16, 2007.

* cited by examiner

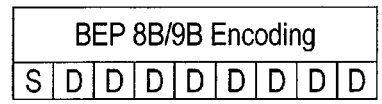
Fig. 8A
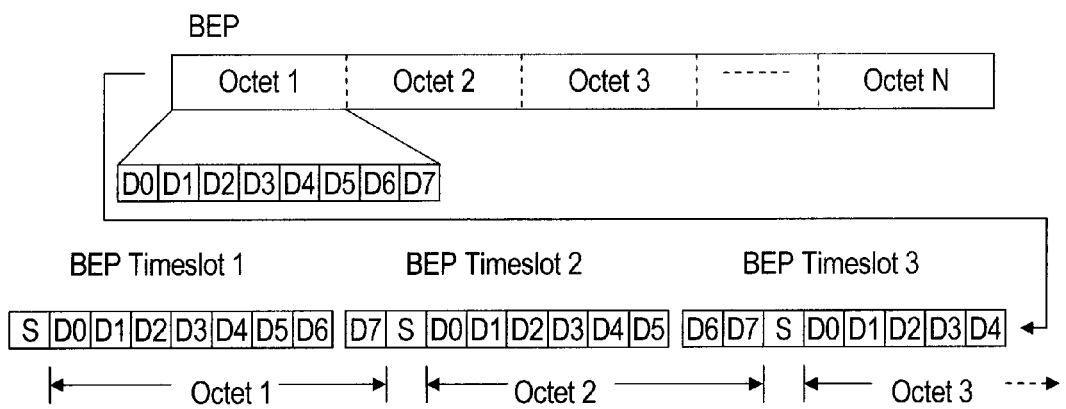
Fig. 8B
Fig. 9

MULTI-COMPONENT COMPATIBLE DATA ARCHITECTURE

CROSS-REFERENCE TO RELATED APPLICATIONS

This application is a divisional application of U.S. patent application Ser. No. 11/737,803 filed Apr. 20, 2007, U.S. Pat. No. 7,675,945 and entitled "Multi-Component Compatible Data Architecture", which claims the benefit of U.S. Provisional Application Ser. No. 60/826,764 filed Sep. 25, 2006 and entitled "System for TDM Data Transport Over Ethernet Interfaces," U.S. Provisional Application Ser. No. 60/857,741 filed Nov. 8, 2006 and entitled "TDM Data Transport Over Ethernet," and U.S. Provisional Application Ser. No. 60/886,833 filed Jan. 26, 2007 and entitled "Closed Loop Clock Synchronization," all of which are by Serge F. Fourcand and are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Ethernet is the preferred protocol for many types of networks because it is flexible, decentralized, and scalable. Ethernet is flexible in that it allows variable-sized data packets to be transported across different types of mediums using various nodes each having different transmission speeds. Ethernet is decentralized in that it allows the end devices to transmit and receive data without oversight or intervention from a centralized server or party. Furthermore, Ethernet is scalable in that it can be implemented in both small-scale and large-scale networks. These advantages make Ethernet a preferred choice for data distribution in many computer networks.

Unfortunately, Ethernet does have some drawbacks. When Ethernet packets are transported through the network, the Ethernet packets contend with other traffic being transported over the same links or through the same nodes. The contentious traffic not only comprises packets bound for the same destination, but also packets bound for other destinations that are transported over the same link or through the same node as the Ethernet packet. This contention produces burstiness and jitter at the nodes within the network. Some of these problems can be addressed by using resource arbitration and buffers at the nodes, and by prioritizing the packets into high priority data and low priority data. However, these solutions increase network complexity, increase delay, and detract from the inherent advantages of Ethernet.

The aforementioned drawbacks are part of the reason Ethernet has not been widely implemented in networks carrying time division multiplexed (TDM) data. Specifically, Ethernet does not provide a sufficient Quality of Service (QoS) to meet the stringent jitter and data loss requirements for voice traffic in the public switched telephone network (PSTN) and other TDM networks. Instead, TDM traffic is carried by highly synchronized networks, such as synchronous optical networks (SONET) and synchronous digital hierarch (SDH) networks. Various Ethernet enhancements, such as circuit emulation, provider backbone transport, and pseudowires, have been proposed to address the jitter and data loss issues, but these enhancements fail to couple the flexibility of Ethernet with the high QoS requirements of TDM networks. Thus, a need exists for an improved Ethernet protocol that is flexible, easy to implement, supports the QoS requirements of TDM networks, and is compatible with existing technology.

SUMMARY

In one aspect, the disclosure includes a backbone network, comprising a first switch comprising a first port configured to communicate a data stream via an Ethernet interface, and a second port configured to communicate the data stream via a SONET/SDH interface, and a second switch comprising a third port configured to receive the data stream from the first switch via the Ethernet interface, wherein the first switch and the second switch are synchronized.

In another aspect, the disclosure includes a network component comprising a first port configured to communicate a first data stream over an Ethernet interface, the first data stream comprising a first Ethernet packet data and a first time division multiplexed data, a second port configured to communicate a second data stream over a SONET/SDH interface, the second data stream comprising a second Ethernet packet data and a second time division multiplexed data, a switching fabric coupled to the first port and the second port and configured to communicate at least some the first data stream and the second data stream between the first port and the second port, wherein the Ethernet packet data and the time division multiplexed data are not encapsulated.

In a third aspect, the disclosure includes a network comprising a first line card configured to send a data stream via an Ethernet interface, wherein the data stream comprises an Ethernet packet data and a time division multiplexed data, a second line card configured to receive the data stream via the Ethernet interface, a third line card configured to send the data stream via a SONET/SDH interface, and a fourth line card configured to receive the data stream via the SONET/SDH interface, wherein the first line card, the second line card, the third line card, and the fourth line card are synchronized to an absolute time.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 8A is an illustration of a 9B encoding scheme.

FIG. 8B is an illustration of a plurality of BEP octets encoded using the 8B encoding scheme.

FIG. 9 is an illustration of an exemplary data stream combining the 7B and 9B encoding schemes.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a unified network architecture that may transport voice, video, and data services across various types of networks. The unified network architecture comprises a plurality of multi-transport switches that communicate time division multiplexed (TDM) data and packet data over both Ethernet and SONET/SDH links without encapsulating the data. Specifically, the multi-transport switches may communicate the TDM and packet data using a plurality of operational modes. The multi-transport switches may also communicate with both Ethernet and SONET/SDH switches to establish at least one synchronous communication path.

The operational modes disclosed herein comprise a Huawei synchronized (H-SYNC) mode, a Huawei time division multiplexed (H-TDM) mode, and a Huawei jumbo (H-JUMBO) mode. The H-SYNC mode synchronizes Ethernet nodes by including synchronization and timestamp information in an inter-packet gap. The H-TDM mode defines an overlay synchronous timeslot scheme that transports octet-sized timeslots within a predefined synchronization window. The timeslots may carry synchronization data, timestamp data, control data, and payload data, where the payload data may comprise TDM data, high performance flow (HPF) data, and/or best-effort packet (BEP) data. The overlay synchronous timeslot scheme may allow data to be efficiently mapped between Ethernet nodes and SONET/SDH nodes without encapsulating the data. The H-JUMBO mode may partition the H-TDM data stream into a plurality of sections, and encapsulate each section into an Ethernet packet that may be processed by Ethernet nodes that do not support the H-TDM operational mode.

Figure 1:
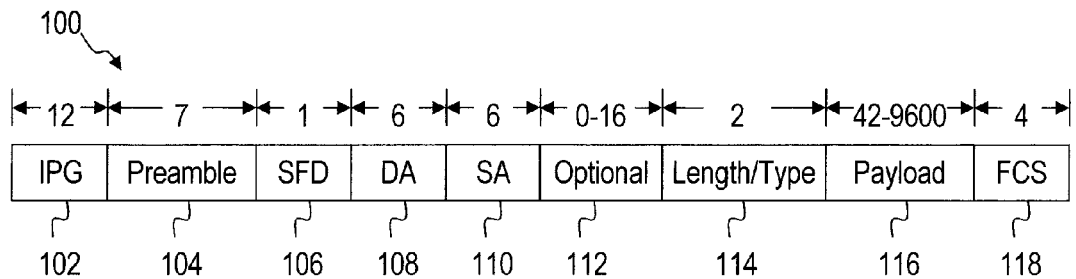
FIG. 1 is an illustration of an embodiment of an Ethernet MAC frame.

FIG. 1 illustrates one embodiment of an Ethernet packet 100. The packet 100 begins with a preamble 104, which may be about seven octets of a repeated pattern, such as "10101010." The preamble 104 may allow a node's physical layer signaling (PLS) circuitry to reach steady-state synchronization with the packet's timing. The preamble 104 may be followed by a start of frame delimiter (SFD) 106, which may be a single octet with the pattern "10101011," and may be used to indicate the beginning of the packet 100. The destination address (DA) 108 may specify the address of the destination node for which the packet 100 is intended, and may be about six octets. The source address (SA) 110 may specify the address of the source node from which the packet 100 originated, and may be about six octets. The packet 100 may contain a plurality of optional octets 112 that are used to associate the packet 100 with a type protocol identifier (TPID) and/or a virtual local area network identifier (VID). For example, up to about sixteen octets may be used for associating the packet 100 with a TPID and a VID, for example as described in IEEE 802.1Q.

The packet 100 continues with a length/type field 114, which may specify the length of the payload 116 and the Ethernet protocol being used, and may be about two octets. The payload 116 may be a variable-sized field that carries a data payload. Although the payload 116 may contain any amount of data, in specific embodiments the payload 116 may contain from about 42 octets to about 1,500 octets in standard packets, and may contain from about 9,000 octets to about 12,000 octets in jumbo packets. The frame check sequence (FCS) 118 may be used for error detection, and may be a four-octet field that contains a cyclic redundancy check (CRC) value calculated using the contents of the packet 100. Although not part of the packet 100, the inter-packet gap (IPG) 102 may be data or idle characters that separate the packets 100. The IPG 102 may contain about twelve octets of idle control characters, although any amount of data or idle characters may be used in the IPG 102.

Figure 2:
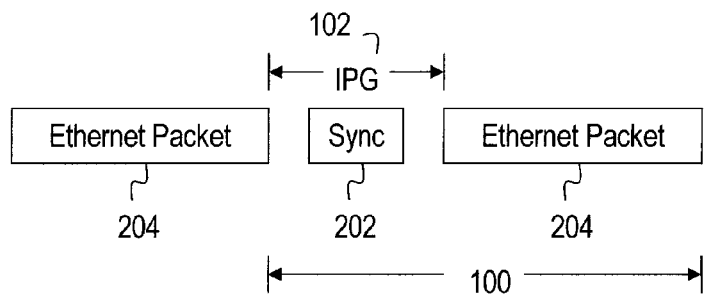
FIG. 2 is an illustration of an embodiment of an Ethernet data stream.

As illustrated in FIG. 2, a synchronous timestamp (Sync) 202 may be inserted in the IPG 102 between two Ethernet packets 204. The Sync 202 may be used to synchronize an upstream node's clock with a downstream node's clock in the H-Sync operational mode. Specifically, the Sync 202 may be a four-octet packet that synchronizes the two clocks in frequency, but does not necessarily align the clocks in phase. The Sync 202 may also indicate the beginning of a synchronization window having a predetermined period, such as about 125 microseconds (μs). The Sync 202 need not be located in every IPG 102, but in some embodiments, it may be advantageous to have at least one Sync 202 during every synchronization window.

In some embodiments, there are advantages to inserting the timestamp in the IPG 102. For example, the H-Sync timestamp does not affect the available bandwidth because the Sync 202 is located in the IPG 102, which is an idle period in standard Ethernet communications. Further, communicating the timestamp in the IPG 102, rather than within the packet 100, allows the timestamp to be transmitted independent of the packet 100. The independent transmission of the Sync 202 and the packet 100 ensures that the timestamp will not become stale, and allows the upstream and downstream nodes' clocks to be synchronized without transmitting multiple timestamps from the upstream node to the downstream node. Similarly, upon receiving the timestamp at a downstream node, the timestamp may be extracted and processed without processing the packet 100.

Figure 3:
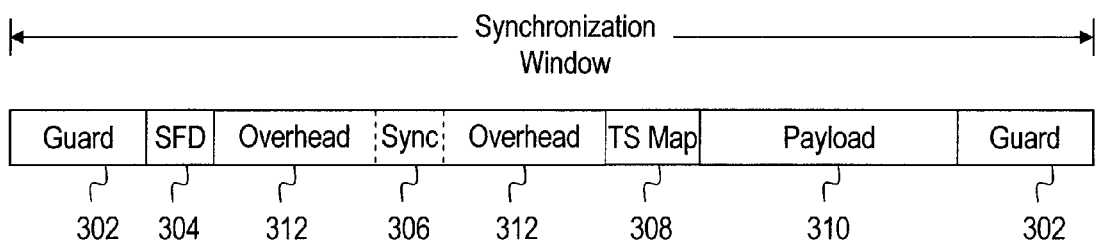
FIG. 3 is an illustration of an embodiment of an H-TDM overlay synchronous timeslot scheme.

FIG. 3 depicts one embodiment of the overlay synchronous timeslot scheme of the H-TDM operational mode. Specifically, FIG. 3 illustrates an overlay synchronous timeslot scheme within a synchronization window having a predefined period, such as about 125 microseconds (μs). The overlay synchronous timeslot scheme comprises the SFD 304, the Sync 306, a timeslot map (TS Map) 308, and a payload 310. The SFD 304 may delineate a beginning of the H-TDM frame, and may be a reserved Ethernet control symbol, such as the /K28.1/control symbol. As persons of ordinary skill in the art will recognize, the /K28.1/control symbol comprises a comma that may be used to enable 8 bit/10 bit (8B/10B) symbol synchronization when the overlay synchronous timeslot scheme is communicated on 8B/10B encoded media. In an embodiment, the SFD 304 may also specify the size of the H-TDM frame.

The Sync 306 may be used to initiate the synchronization windows, synchronize the synchronization windows, and phase-align the synchronization windows between two nodes. The Sync 306 may comprise a forward timestamp that indicates the transmission time of the Sync 306. The Sync 306 may also comprise a loop-back timestamp, the composition of which varies depending on whether the Sync 306 is being transmitted from an upstream node or a downstream node. Specifically, the loop-back timestamp may comprise a calculated one-way transmission delay when the Sync 306 is being transmitted from the upstream node. Alternatively, the loop-back timestamp may comprise a calculated internal processing delay and a synchronization reference when the Sync 306 is being transmitted from the downstream node. A detailed description of the Sync 306, the frequency-synchronization process, and the phase-alignment process is found in U.S. patent application Ser. No. 11/735,590 entitled "Inter-Packet Gap Network Clock Synchronization."

The overlay synchronous timeslot scheme may continue with the TS Map 308, which may specify the type and location of the data in the payload 310. In one embodiment, the individual timeslots in the payload 310 may be assigned to TDM, HPF, and BEP traffic according to a predefined pattern. For example, the first one thousand timeslots may be assigned to TDM traffic, the subsequent five thousand timeslots may be assigned to HPF traffic, and the subsequent three thousand timeslots may be assigned to BEP traffic. In such an embodiment, the TS Map 308 may be omitted from the H-TDM frame if the nodes are aware of the predefined pattern. Alternatively, the TS Map 308 may indicate the assignment of each timeslot in the payload 310 as a TDM, a HPF, or a BEP timeslot. Using the TS Map 308, TDM, HPF, and BEP traffic may be dynamically interleaved within the overlay synchronous timeslot scheme.

Some timeslots at the beginning and/or end of the synchronization window may be part of a guard interval 302. The guard intervals 302 allow the H-TDM frame to float within the synchronization window. Specifically, the location of SFD 304 in relation to the beginning of the synchronization window may vary between synchronization windows. As such, the guard interval 302 at the beginning of the synchronization window may be the same or a different size than the guard interval 302 at the end of the synchronization window, and the size of the guard intervals 302 in one synchronization window may vary from the size of the guard intervals 302 in other synchronization windows. Such an embodiment may be advantageous because the integrity of the SFD 304, Sync 306, TS Map 308, and the data in the payload 310 is maintained if any of the data in the guard intervals 302 is dropped, corrupted, lost, or otherwise unreadable, for example, due to clock tolerances or other non-deterministic factors. In some embodiments, the guard interval 302 may transport low priority BEP data. Alternatively, the guard interval 302 may be zero-padded or may contain idle characters.

Although the synchronization window may be any duration, there are particular advantages to using a synchronization window with a period of about 125 μs. Specifically, synchronizing the overlay synchronous timeslot schemes to a 125 μs synchronization window allows the Ethernet nodes to be interoperable with the PSTN, SONET, SDH, and other TDM networks. As such, when the overlay synchronous timeslot scheme has a 125 μs synchronization window, SONET/SDH transport overhead 312 may be added to the overlay synchronous timeslot scheme format shown in FIG. 3. The SONET/SDH transport overhead 312 allows the data in the payload 310 to be mapped between Ethernet networks and the SONET/SDH networks used by the PSTN. The SONET/SDH transport overhead 312 is depicted as surrounding the Sync 306 because the Sync 306 may be inserted into various undefined octets of the SONET/SDH transport overhead 312. In an embodiment, the SONET/SDH transport overhead 312 may be omitted from the overlay synchronous timeslot scheme, such that the Sync 306 may be located between the SFD 304 and the TS Map 308.

The overlay synchronous timeslot scheme may allow the H-TDM frame to transport a variety of data types. When the synchronization window has a period of about 125 μs and each timeslot carries an octet of data, each of the timeslots in the overlay synchronous timeslot scheme represents a single channel with about 64 kilobits per second (Kbps) of bandwidth. These channels provide sufficient bandwidth to carry a voice conversation compatible with the PSTN. Thus, voice channels that are carried in an H-TDM frame may be referred to as TDM data.

The overlay synchronous timeslot scheme also provides octet-sized granularity that supports the communication of other traffic with stringent QoS requirements, referred to herein as HPF data. In an embodiment, the HPF data may require a deterministic amount of bandwidth. Examples of HPF traffic comprise video, audio, and other multimedia traffic. HPF traffic may be assigned multiple channels with single-octet granularity according to the bandwidth requirements of the HPF traffic. In other words, each channel assigned to a HPF increases the bandwidth allocated to the HPF by 64 Kbps. For example, a low resolution streaming video HPF requiring about 256 Kbps of bandwidth may be assigned about four channels from the H-TDM frame. Similarly, a HPF requiring about 3.2 megabits per second (Mbps) of bandwidth may be assigned about fifty channels from the H-TDM frame. The deterministic allocation of bandwidth may allow the HPFs to be transmitted without interruptions or delays within the HPF data stream. In such a case, a back-pressure signaling system may not be required. In an embodiment, HPFs may be allocated bandwidth in 576 Kbps granularity to correspond to an entire column of a SONET/SDH frame.

In addition to being assigned to carry TDM and HPF data, the timeslots in the payload 310 may be assigned to carry BEP data. The BEP data may comprise low priority Ethernet packet data, data downloads, web browsing, or any other low priority data. In an embodiment, any timeslots in the payload 310 that are not assigned as TDM or HPF timeslots are automatically assigned as BEP timeslots. In another embodiment, at least a portion of the timeslots are assigned as BEP timeslots to ensure that at least some BEP data is contained in each H-TDM frame.

While the allocation of bandwidth may be performed as described above for constant bit rate (CBR) data streams, variable bit rate (VBR) data streams present an additional challenge. In an embodiment, VBR data streams may be allocated bandwidth according to a maximum amount of bandwidth that the VBR data streams may use. Consider a case wherein the VBR HPF may be a Motion Picture Experts Group (MPEG) encoded video data stream. The MPEG format may encode video data such that less bandwidth is needed to display scenes with few changes or movement, and more bandwidth is needed to display scenes with a lot of changes or movement. In such a case, a HPF carrying the MPEG encoded video data may be allocated a sufficient quantity of timeslots to transport the maximum amount of bandwidth that the MPEG encoded video data stream will require. During scenes where less than the maximum amount of bandwidth is being used to communicate the MPEG encoded video data stream, the unused bandwidth may be reused by other data types, as described in detail below.

Figure 4:
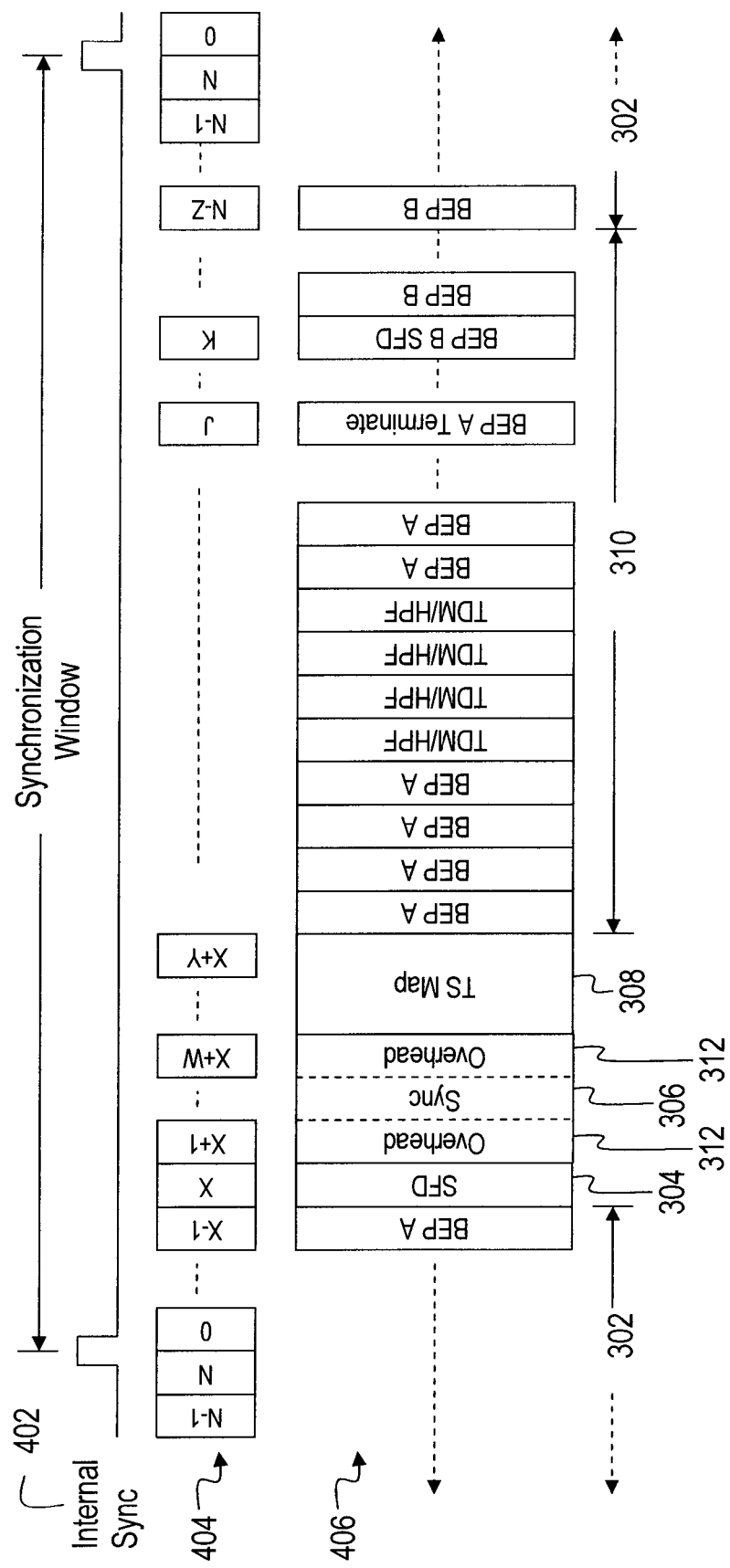
FIG. 4 is an illustration of an exemplary layout of timeslots of the H-TDM overlay synchronous timeslot scheme.

FIG. 4 illustrates a more detailed layout of the overlay synchronous timeslot scheme from FIG. 3. FIG. 4 contains three rows of information: an internal synchronization signal 402 that delineates the synchronization window, a timeline 404 that enumerates each timeslot, and a descriptor 406 that describes the data that may be contained within each timeslot. The internal synchronization signal 402 may correspond to the synchronization window established when initiating the H-Sync or H-TDM operational modes, as described in U.S. patent application Ser. No. 11/735,590 entitled "Inter-Packet Gap Network Clock Synchronization."

The synchronization window may begin at timeslot 0. Timeslots 0 through X represent the guard intervals 302, and thus the descriptor 406 indicates that BEP traffic may be transported during these timeslots. Specifically, timeslot X−1 comprises a first part of a first BEP, identified as BEP A. At timeslot X, BEP A may be interrupted by the SFD 304 that may delineate the beginning of the H-TDM frame. If the H-TDM frame comprises SONET/SDH overhead 312, as shown in FIG. 3, then the SONET/SDH overhead 312 and the Sync 306 are communicated subsequent to the SFD 302, e.g. in timeslots X+1 through X+W. In one embodiment, at least one idle octet or SONET/SDH overhead 312 octet may be inserted between timeslots X+1 and X+W. Such octets enable efficient mapping of the Sync 306 to an SONET/SDH frame, such that the Sync 306 aligns with the columns of the SONET/SDH frame. The TS Map 308 may follow timeslot X+W, and may indicate the type and location of the HPF, TDM, and/or BEP timeslots in the payload 310. The TS Map 308 may extend through timeslot X+Y.

The payload 310 of the H-TDM frame follows timeslot X+Y. The payload 310 may contain a second part of BEP A, which may be interrupted by at least one timeslot of TDM or HPF data. Upon the completion of the TDM or HPF timeslots, BEP A may continue until BEP A terminates at timeslot J. Following an IPG or immediately following the end of BEP A, a second BEP identified as BEP B may be initiated in timeslot K and the remaining timeslots. The H-TDM frame may end at timeslot N, however BEP B may continue into the guard interval 302, and perhaps into the guard interval 302 of the subsequent synchronization window. Thus, the transmission of a BEP does not necessarily end at the end of the H-TDM frame or at the end of the synchronization window, but instead when the BEP is complete or when interrupted by the subsequent SFD 304.

While the timeslot layout depicted in FIG. 3 communicates two BEPs, any amount of BEP data may be communicated within the synchronization window. For example, the synchronization window may contain no BEP data, part of a BEP, exactly one BEP, or multiple BEPs. Further, while FIG. 4 illustrates that the BEP data is interrupted only once due to a series of TDM and/or HPF timeslots, persons of ordinary skill in the art will appreciate that the BEP data may be interrupted any number of times by any number of TDM or HPF timeslots, or by timeslots assigned to a different instance of BEP data, as described below.

Figure 5:
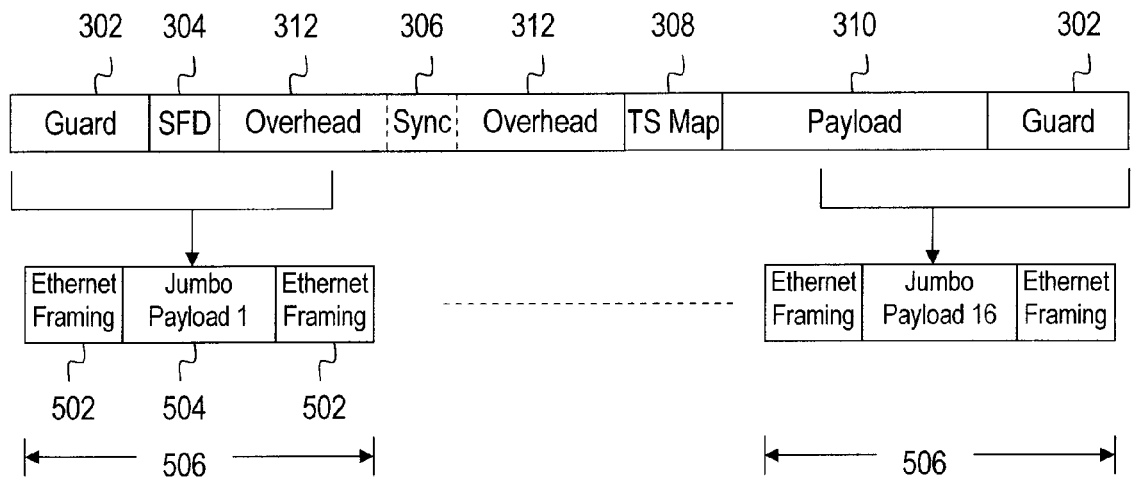
FIG. 5 is an illustration of the partitioning of the H-TDM overlay synchronous timeslot scheme using the H-JUMBO operational mode.

FIG. 5 illustrates an example of the H-TDM overlay synchronous timeslot scheme partitioned using the H-JUMBO operational mode. As described above, the H-JUMBO operational mode partitions the overlay synchronous timeslot scheme into sections that are encapsulated into Ethernet frames. The sections may not necessarily correspond to any particular content within the overlay synchronous timeslot scheme, but rather may be selected based on the quantity of the octets. While any size may be selected, in specific embodiments each section may be sized to fit into the standard Ethernet frame payloads, which are between about 42 octets and about 1,500 octets, or jumbo Ethernet frame payloads, which are more than 1,500 octets, e.g. between about 9,000 octets and about 12,000 octets. In another specific embodiment, jumbo Ethernet frames with a payload of about 9,600 octets are used in the H-JUMBO operational mode.

As shown in FIG. 5, each section of the H-TDM overlay synchronous timeslot scheme may be inserted into a jumbo payload 504 that may be encapsulated within Ethernet Layer 2 framing 502. The Ethernet Layer 2 framing 502 allows the H-TDM overlay synchronous timeslot scheme to be transported by standard Ethernet nodes, e.g. nodes that do not support the H-SYNC or H-TDM operational modes. The Ethernet layer 2 framing 502 may then be removed, and the H-TDM overlay synchronous timeslot scheme may be reassembled and transported as before. In an embodiment, optional VIDs and/or TPIDs may be comprised in the jumbo Ethernet frames 506 to assist in reordering the received packets. In another embodiment, the jumbo Ethernet frames 506 may be transported in series to ensure proper ordering. When implementing a 10 Gigabits per second (Gbps) Ethernet interface and a payload of about 9,600 octets for each of the jumbo Ethernet frames 506, the H-TDM overlay synchronous timeslot scheme may be encapsulated within about sixteen jumbo Ethernet frames 506. Fewer jumbo frames may be required when implementing Gigabit Ethernet interfaces.

As mentioned above, the H-TDM overlay synchronous timeslot scheme may be communicated over both Ethernet and SONET/SDH interfaces without encapsulation. Specifically, SONET/SDH frames may be communicated over interfaces without embedded signaling, whereas Ethernet packets may be communicated over interfaces using an under-laying Ethernet Layer 1 embedded signaling protocol. To accommodate the differences between the Ethernet and SONET/SDH interfaces, some data manipulation may occur. Specifically, each timeslot in the H-TDM overlay synchronous timeslot scheme may be encoded with signaling in accordance with the data type assigned to the timeslot and the type of interface over which the data is transported, as described in detail below.

Figure 6A:
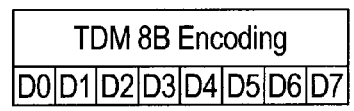
FIG. 6A is an illustration of an 8B encoding scheme.

FIG. 6A illustrates an embodiment of an eight-bit (8B) data encoding scheme that may be used for timeslots assigned to carry TDM data. The 8B encoding scheme places exactly one TDM byte, e.g. bits D0 through D7, in each timeslot that is assigned to carry TDM data. Using all eight bits of the octet for TDM data does not leave any space for embedded signaling. However, the TDM data does not require any embedding signaling because the eight-bit bytes used by the PSTN already contain embedded signaling, and thus there is no need to add additional signaling to the TDM data. Such a one-to-one correlation between the TDM bytes and the 8B-encoded octets may be particularly beneficial when communicating the overlay synchronous timeslot scheme over SONET/SDH interfaces.

Figure 6B:
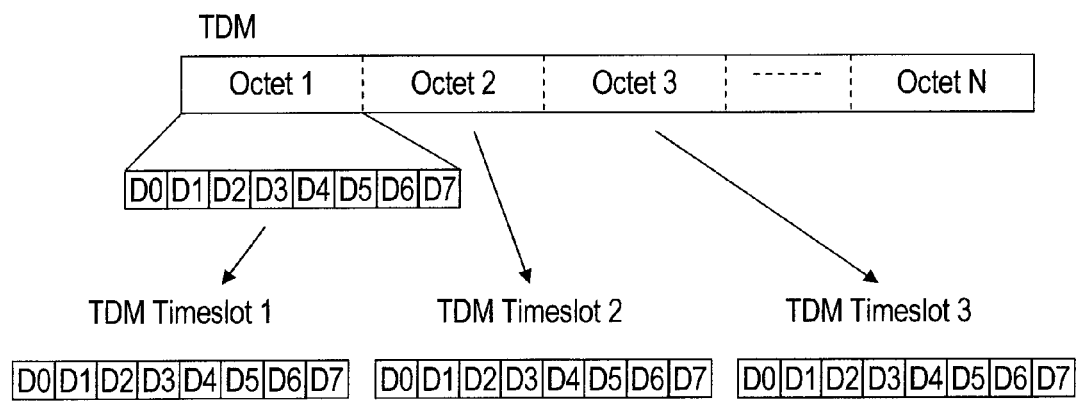
FIG. 6B is an illustration of a plurality of TDM octets encoded using the 8B encoding scheme.

FIG. 6B illustrates an example of the correlation between a TDM data stream and the 8B-encoded TDM timeslots. The TDM data stream comprises Octet 1 through Octet N, where each octet carries eight data bits, D0 through D7. As described above, each timeslot of the H-TDM overlay timeslot scheme also carries eight bits of data. As such, the eight bits of Octet 1 may be carried in the eight bits of TDM timeslot 1, the eight bits of Octet 2 may be carried in the eight bits of TDM timeslot 2, and the eight bits of Octet 3 may be carried in the eight bits of TDM timeslot 3. Consequently, each octet in the TDM data stream may be carried in its entirety in one of the timeslots assigned to carry TDM data.

Figure 7A:
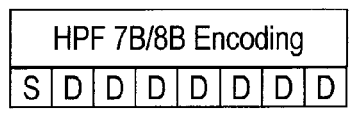
FIG. 7A is an illustration of a 7B encoding scheme.

FIG. 7A illustrates an embodiment of a 7 bit/8 bit (7B) data encoding scheme for timeslots assigned to carry HPF data. The 7B encoding scheme places seven bits of an eight-bit HPF byte in each timeslot that is assigned to carry HPF data. Using only seven bits of the octet for HPF data leaves one bit available for embedded signaling, which is referred to as the 7B signaling bit. The 7B encoding scheme may be particularly beneficial when communicating the HPF data in the overlay synchronous timeslot scheme over SONET/SDH interfaces.

The 7B signaling bit may indicate whether the HPF timeslot is active or idle. For example, when the 7B signaling bit has a "1" value, the HPF timeslot may be active and the data carried in the HPF timeslot may be HPF data. When the 7B signaling bit has a "0" value, the HPF timeslot may be idle and the HPF timeslot may carry other data types. Persons of ordinary skill in the art will recognize that the values used to indicate whether a HPF timeslot is active or idle are arbitrary, and that a zero value may just as easily be used to indicate the HPF timeslot is active. In addition, the position of the 7B signaling bit may be fixed as the first bit of every HPF timeslot. Alternatively, the 7B signaling bit may be in any other location or the location may vary.

When the HPF timeslots carry HPF data, the beginning and end of the HPF data may be indicated by a transition of the 7B signaling bit between the idle state and the active state. For example, if an HPF timeslot is idle, e.g. has its 7B signaling bit set to zero, and a subsequent HPF timeslot is active, e.g. has its 7B signaling bit set to one, then the subsequent timeslot may contain the beginning of the HPF data. In such an embodiment, the HPF data may be shifted to the beginning of the HPF timeslot. In other words, the HPF data may begin immediately after the 7B signaling bit. Alternatively, if an HPF timeslot is active, e.g. has its 7B signaling bit set to one, and a subsequent HPF timeslot is idle, e.g. has its 7B signaling bit set to zero, then the subsequent timeslot may contain the end of the HPF data. When the HPF data ends, the remainder of the HPF timeslot may be filled with zeros or otherwise padded. Alternatively, the HPF timeslot may proceed to other data, such as BEP data.

When the 7B encoding scheme is implemented, the capacity of the HPF timeslots may be less than the capacity of the original network interface. Specifically, the use of one of the eight bits as a signaling bit may equate to about 14 percent overhead per octet. Thus, about 86 percent of the HPF timeslots may be used to carry data when using the 7B encoding scheme. If each timeslot in the H-TDM overlay timeslot scheme provides about 64 kbps of bandwidth and the timeslots are assigned to each data type on a SONET/SDH column basis, then each SONET/SDH column represents about 576 kbps of bandwidth. As such, each SONET/SDH frame assigned to carry HPF data may have a maximum bandwidth of about 504 kbps when implementing the 7B encoding scheme described herein. Such a reduction in data transport capacity is comparable to the data capacity reduction that is experienced when Ethernet packets are encapsulated in SONET/SDH frames. In other words, the bandwidth consumed by the 7B signaling bit is about equal to the bandwidth consumed by the preamble, the start of frame delimiter, the IPGs, and/or any other non-data carrying portions of the Ethernet data stream that are encapsulated into the SONET/SDH frames.

In addition to signaling, the 7B signaling bit allows the bandwidth to be dynamically reused when there is no HPF data. Specifically, when the 7B signaling bit indicates that the HPF timeslot is idle, the seven data-carrying bits of the HPF timeslot may be immediately reused to carry other data, such as BEP data. Conversely, when the 7B signaling bit indicates that the HPF timeslot is active, the seven data-carrying bits of the HPF timeslot may be immediately used to carry HPF data, e.g. without waiting for the BEP or other data to be completed. The instantaneous switching of traffic types means that no additional HPF buffering may be needed when reusing the HPF channels for other traffic types.

The reuse of the HPF timeslots by the BEP traffic does not affect the switching of the synchronous transport signal (STS) switch fabric. In an embodiment, BEP data may be switched using a standard Ethernet switching fabric, whereas TDM and HPF data may be switched using a standard SONET/SDH STS switching fabric. U.S. patent application Ser. No. 11/735,591, entitled "Multiplexed Data Stream Payload Format," provides a detailed disclosure of the demultiplexing of the H-TDM data stream. By the time the H-TDM data stream reaches the point where the TDM and HPF traffic are separated from the BEP traffic, it may be possible that some supervision and/or framing information, such as that contained in SDH/SONET overhead 312, has already been added to the stream, and therefore would have to be regenerated if the stream going to the TDM switch fabric is altered.

There are many switching options for the data in the idle HPF timeslots. If the reuse of idle HPF timeslots occurs before the data reaches the STS switch fabric, then the data reusing the HPF timeslot may be forwarded to the TDM switch fabric where it may be switched as if it were provisioned for the HPF channel. This extraneous switched data may later be added to the BEP data or discarded as it leaves the STS switch fabric. Alternatively, the data reusing the HPF timeslot may be forwarded to the Ethernet switching fabric to be switched as normal BEP data. In such a case, a fixed value may be inserted in the idle HPF timeslots to replace the BEP traffic when the BEP traffic is extracted. In some of these cases, supervision and/or framing information may have to be regenerated. If the reuse occurs after the data passes through the STS switch fabric, the data reusing the HPF timeslot may be selected from the BEP data egress on the Ethernet switch fabric or an egress buffer that stores the BEP data that is output on the Ethernet switch fabric.

Figure 7B:
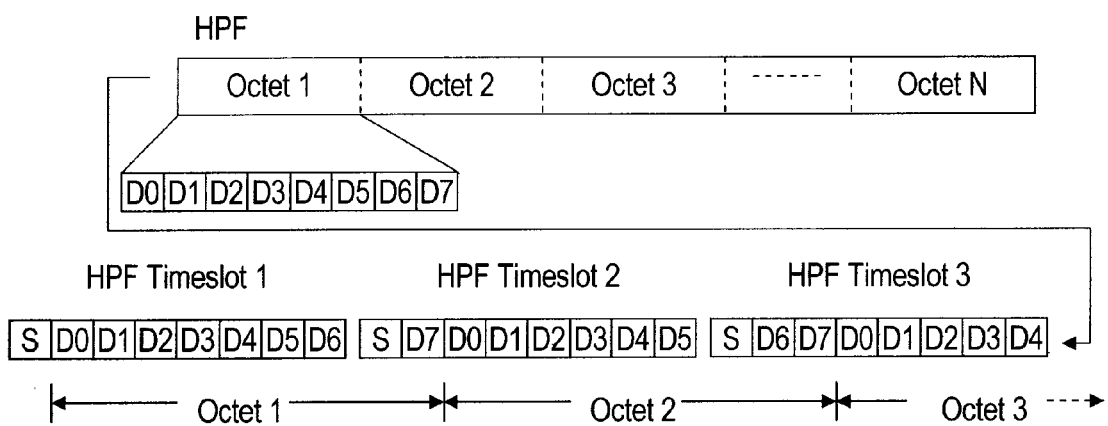
FIG. 7B is an illustration of a plurality of HPF octets encoded using the 7B encoding scheme.

FIG. 7B illustrates an example of the correlation between a HPF data stream and the 7B-encoded HPF timeslots. The HPF data stream comprises Octet 1 through Octet N, with each octet carrying eight data bits, D0 through D7. In contrast with the TDM timeslots shown in FIG. 6B, the 7B encoding scheme does not provide sufficient bandwidth for each HPF timeslot to carry an entire HPF octet. Consequently, the eight data bits of each of the HPF octets may be bit shifted into the seven available bits in each HPF timeslot. For example, HPF Timeslot 1 comprises the 7B signaling bit in the first bit and data bits D0 through D6 from HPF Octet 1 in the remaining bits. Similarly, HPF Timeslot 2 comprises the 7B signaling bit in the first bit, and data bit D7 from HPF Octet 1 and data bits D0 through D5 from HPF Octet 2 in the remaining bits. Finally, HPF Timeslot 3 comprises the 7B signaling bit in the first bit, and data bits D6 through D7 from HPF Octet 2 and data bits D0 through D4 from HPF Octet 3 in the remaining bits.

FIG. 8A illustrates an embodiment of an 8 bit/9 bit (9B) encoding scheme that may be used for BEP data. The 9B encoding scheme comprises a single signaling bit and eight bits of BEP data. Using nine bits allows the 9B encoding scheme to contain signaling information and an entire octet of BEP data. The 9B encoding scheme may be particularly useful when the BEP data is transported over a SONET/SDH interface.

The beginning and end of a BEP may be indicated by the transition of the signaling bit. In an embodiment, the transition of the 9B signaling bit from a zero to a one may indicate the beginning of a new BEP, whereas the transition of the 9B signaling bit from a one to a zero may indicate the end of the BEP. Persons of ordinary skill in the art will recognize that the transitions of the 9B signaling bit from one to zero to indicate the end of the BEP is arbitrary, and that the transition from a one to a zero may be used to indicate the beginning of the BEP. When a BEP terminates in a BEP timeslot or in a reused HPF timeslot, the remainder of the BEP timeslot or reused HPF timeslot may be filled with zeros or otherwise padded. The subsequent BEP timeslots or reused HPF timeslots, including the 9B signaling bit, may also be filled with zeros or padded until a new BEP is detected. When the new BEP is detected, the new BEP may begin in the first available bit of the first available BEP timeslot or idle HPF timeslot.

In the 9B encoding scheme, the position of the 9B signaling bit may vary within the BEP timeslots. Specifically, because the 9B signaling bit is positioned in front of eight bits of BEP data and the BEP timeslots contain eight bits, the position of the signaling bit may increment one position in each subsequent timeslot. For example, when three BEP timeslots are adjacent to one another, the 9B signaling bit may be located in the first bit in a first timeslot, in the second bit in the second timeslot, and in the third bit in a third timeslot. As such, every ninth BEP timeslot may lack a 9B signaling bit. In other words, the BEP timeslot may not contain a 9B signaling bit when the previous BEP timeslot contains the 9B signaling bit in the eighth bit of a BEP timeslot.

FIG. 8B illustrates an example of the correlation between a BEP data stream and the 9B-encoded BEP timeslots. The BEP data stream comprises Octet 1 through Octet N, with each octet carrying eight data bits, D0 through D7. Using the 9B encoding scheme, each of the BEP octets may be preceded by the signaling bit to generate the nine-bit segments. Because the BEP timeslots do not have enough bandwidth to carry all nine bits in each BEP timeslot, the nine bits of each 9B-encoded segment may be bit shifted into the eight available bits in each BEP timeslot or into the seven available data bits in each idle HPF timeslot. For example, BEP Timeslot 1 contains the 9B signaling bit in the first bit and bits D0 through D6 from BEP Octet 1 in the remaining bits. Similarly, BEP Timeslot 2 contains the bit D7 from Octet 1 in the first bit, the 9B signaling bit in the second bit, and bits D0 through D5 from BEP Octet 2 in the remaining bits. Finally, BEP Timeslot 3 contains the bits D6 and D7 from Octet 2 in the first two bits, the 9B signaling bit in the third bit, and bits D0 through D4 from BEP Octet 3 in the remaining bits.

FIG. 9 illustrates an exemplary data stream depicting the various properties of the 7B encoding and 9B encoding schemes. Specifically, FIG. 9 illustrates a data stream organized into three SONET/SDH-like columns that are assigned to carry HPF data. Each of columns X, X+1, and X+2 comprise nine rows, row 1 through row 9, of data organized into eight bit segments, bit 0 through bit 7 in each column. As persons of ordinary skill in the art will recognize, data is transported from the SONET/SDH frame on a row-by-row basis such that bits 0 through 7 of columns X, X+1, and X+2 are serially communicated for row 1, then row 2, and so forth. As such, data that is not completed in column X continues in the same row of column X+1, and data that is not completed in column X+2 continues in the subsequent row of column X.

The eight bits of each row and column combination constitute the eight bits of an HPF timeslot. As such, each row of the three columns contains one HPF timeslot. When each of the three columns are assigned to carry HPF data and the 7B encoding scheme is implemented, the HPF timeslots align in the columns such that the first bit of each column is the 7B signaling bit. Specifically, bit 0 in all of the rows and for all three columns carries the 7B signaling bit, with a zero representing an idle HPF timeslot and a one representing an active HPF timeslot.

As shown in row 1, column X and column X+1 have the 7B signaling bit set to one, and thus indicate that HPF data is being transmitted. As shown in FIG. 9, the HPF data terminates at column X+1, row 1, bit 3, wherein the remaining bits in column X+1, row 1 are zero-padded. The 7B signaling bits in the subsequent eight HPF timeslots are set to zero to indicate the HPF timeslots are idle. As such, the idle HPF timeslots may be reused to carry BEP data.

When reusing the idle HPF timeslots, the transmission of a BEP may resume at the bit where the BEP left off. As shown in column X+2, row 1, the transmission of the BEP resumes at bit 1 with the BEP data bit D4. The resumption of the BEP transmission at bit D4 assumes that the last BEP data bit that was transmitted was BEP data bit D3, which would have occurred prior to column X. If no BEP data had been transmitted prior to column X, then the 9B signaling bit would be in column X+2, row 1, bit 1 with BEP data bits D0 through D5 following.

The HPF timeslots in rows 2 and 3 of the three columns and the HPF timeslot in row 4 of column X are also idle, as indicated by the 7B signaling bit, e.g. bit 0, being set to zero in those timeslots. As such, BEP data may be placed in each of these idle HPF timeslots, for example, using the 9B encoding scheme. As described above, the location of the 9B signaling bit varies from timeslot to timeslot, and is shown in bold prior to the eight BEP data bits. While the 9B signaling bit remains at a one, the transmission of the BEP across the various columns continues. The end of the BEP may be indicated when the 9B signaling bit transitions to a zero, as shown in column X+2, row 2, bit 2.

Subsequent to the end of the BEP, there may be an idle period during which there may be no HPF or BEP data to place in the HPF timeslots. As shown in FIG. 9, a two octet idle period follows the end of the BEP where the bits are filled with zeros, including the 9B signaling bit. The zeros continue until a non-zero bit is detected, which may be the first signaling bit of a new BEP as shown in column X+1, row 3, bit 6. In some embodiments, BEP traffic resynchronization may be required, for example at the beginning of a BEP or after a fault. In such cases, the resynchronization may be performed by detecting at least nine consecutive zeros in the BEP traffic, not including the 7B signaling bits in reused HPF timeslots.

As shown in column X+2, row 3 and column X, row 4, the BEP data continues in the idle HPF timeslots. When new HPF data is available, the 7B signaling bit is set to one and the BEP data may be interrupted. As shown in column X+1, row 4, bit 0, a new HPF is indicated by the 7B signaling bit being set to one. Thus, column X+1, row 4 is an active HPF timeslot and contains the new HPF data. Likewise, all subsequent HPF timeslots shown in FIG. 9 also contain 7B signaling bits set to one, and thus also are active and contain HPF data.

Various alternative encoding schemes may also be used for the H-TDM overlay synchronous timeslot scheme. For example, the H-TDM overlay synchronous timeslot scheme may be communicated over various types of Ethernet interfaces using one of the underlying Ethernet Layer 1 embedded signaling protocols. Specifically, the Ethernet interfaces may have 8B/10B encoded media or 64 bit/66 bit (64B/66B) encoded media. When communicating the H-TDM overlay synchronous timeslot scheme over such Ethernet interfaces, the HPF and TDM timeslots may be superimposed on top of BEP Ethernet data streams.

The 1000 BASE-X and 10G BASE-X Ethernet interfaces may use the 8B/10B encoding scheme to communicate the H-TDM overlay synchronous timeslot scheme. In such embodiments, the beginning of an H-TDM frame may be delineated using an Ethernet control symbol, such as the /K28.1/control symbol, and may be aligned to the 8B/10B symbols. Using the /K28.1/Ethernet control symbol allows the alignment of the H-TDM frame to be rapid and deterministic. Further, because each 8B/10B octet is a stand-alone symbol and the physical layer Ethernet interface synchronizes itself to the 8B/10B symbols, no alignment may need to be performed at then end of an H-TDM frame.

Each of the TDM, HPF, and BEP timeslots may be mapped to the 8B/10B encoded media using 8B/10B encoding. The 8B/10B codes used for communicating the TDM and HPF timeslots may reflect the 8B/10B signaling used for data content, and the data carried in the TDM and HPF timeslots may be encoded using the 8B and 7B encoding schemes described above. The 8B/10B codes used for communicating the BEP timeslots may reflect the normal Ethernet Layer 1 packet encoding states. The mapping of TDM and HPF timeslots on 8B/10B encoded links may be done on a one-to-one basis such that Ethernet octets may be delayed or replaced by the TDM and HPF timeslots. As described above, the 7B encoding scheme may be used to carry BEP data in the empty space in idle HPF timeslots. When a BEP packet terminates, if a subsequent timeslot is a BEP timeslot, then the End of Packet Ethernet control symbol /K29.7/may be inserted to delineate the end of the BEP. If the subsequent timeslot is an idle HPF timeslot, then the empty space of the idle HPF timeslot may be zero-padded to delineate the end of the BEP.

The 10G BASE-R and 10G BASE-W Ethernet interfaces may use 64B/66B encoded media to communicate the H-TDM overlay synchronous timeslot scheme. When communicating the H-TDM overlay synchronous timeslot scheme over 10G BASE-R Ethernet interfaces, the beginning of the H-TDM frame may be delineated using an Ethernet control symbol, as described above. However, to minimize jitter due to alignment with the 64B/66B sync fields, a pointer may point to the beginning of the SONET/SDH transport overhead 312, and may follow the Ethernet control symbol. The timeslots between the pointer and the beginning of the SONET/SDH transport overhead 312 may be used to communicate BEP data. The TDM, HPF, and BEP timeslots communicated over 10G BASE-R Ethernet interfaces may map to SONET/SDH interfaces as described above, with the addition of the 64B/66B sync fields between blocks of eight octets. Specifically, the TDM, HPF, and BEP timeslots may use the 8B, 7B, and 9B encoding schemes, respectively, to map the data to the SONET/SDH interfaces. Each of the sync fields may be set to '01' to indicate data content when communicating the H-TDM timeslots.

While the H-SYNC, H-TDM, and H-JUMBO operational modes may be useful for communicating packet data and TDM data over any network, these operational modes may be particularly useful for communicating data over backbone networks. As increasing numbers of voice, video, and data services are being offered to consumers, backbone networks may need to communicate packet-based data and TDM-based data efficiently and precisely to support these services. The H-TDM operational mode not only enables communication of high priority TDM and HPF data and lower priority BEP data, but also lends itself for easy and efficient mapping between the major backbone network technologies, Ethernet and SONET/SDH. Further, the H-SYNC and H-JUMBO operational modes enable integration and backwards compatibility with existing Ethernet and SONET/SDH backbone network devices.

Figure 10:
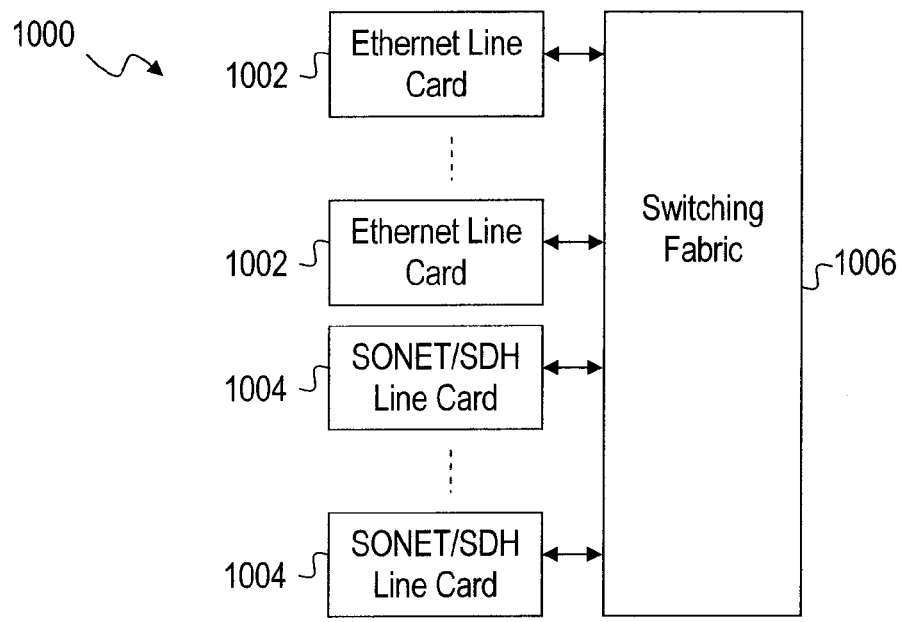
FIG. 10 is an illustration of an exemplary block diagram of a multi-transport switch.

FIG. 10 illustrates an exemplary block diagram of a multi-transport switch 1000 that communicates data across a backbone network using at least one of the H-SYNC, H-TDM, and H-JUMBO operational modes. The multi-transport switch 1000 comprises a plurality of Ethernet line cards 1002, a plurality of SONET/SDH line cards 1004, and a switching fabric 1006. The Ethernet line cards 1002 and the SONET/SDH line cards 1004 may represent the ports on a node, and thus may communicate with similar Ethernet line cards 1002 or SONET/SDH line cards 1004 on other multi-transport switches 1000. The switching fabric 1006 may switch data between two Ethernet line cards 1002, between two SONET/SDH line cards 1004, or between one of the Ethernet line cards 1002 and one of the SONET/SDH line cards 1004. As such, the multi-transport switch 1000 can route data from any of the line cards 1002, 1004 to any other of the line cards 1002, 1004. Various implementations of multi-transport switches 1000 that support the H-SYNC, H-TDM, and H-JUMBO operational modes are shown in FIGS. 11-20 and are described below.

Figure 11:
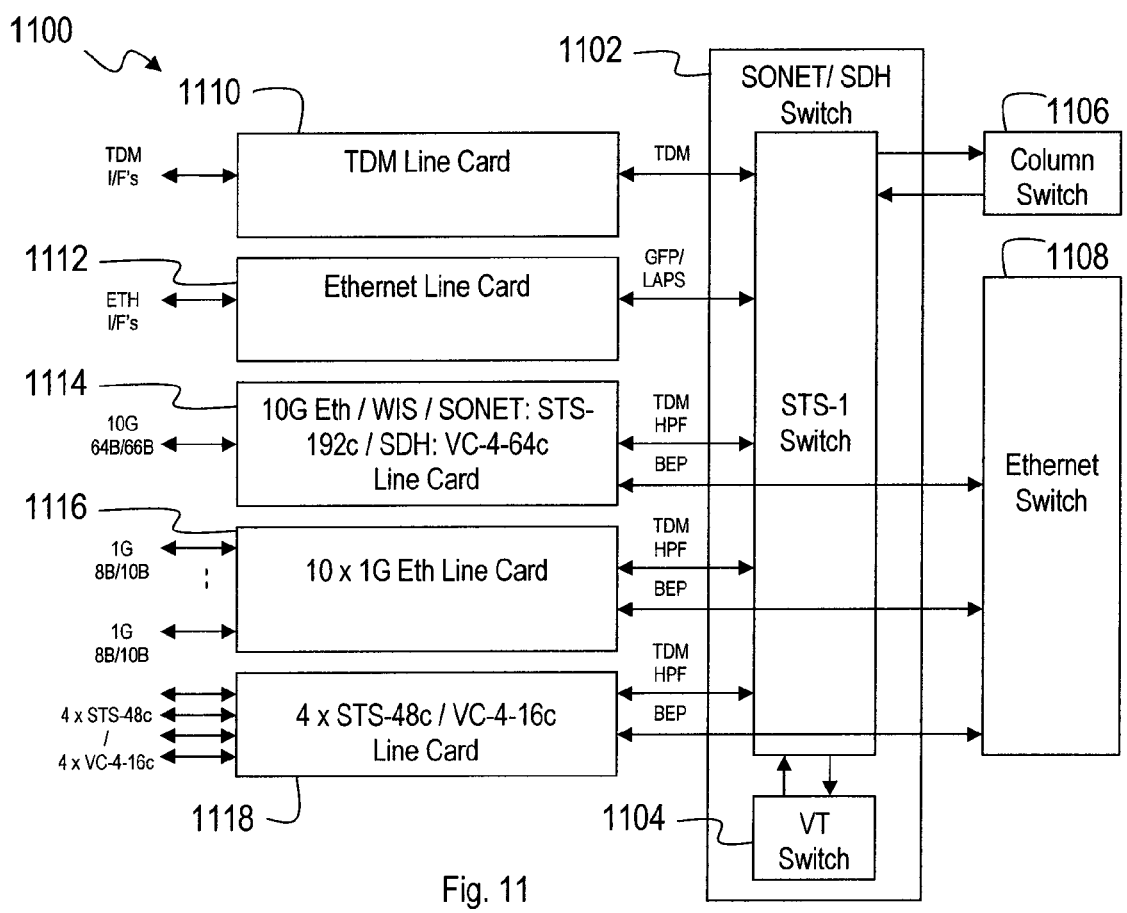
FIG. 11 is an illustration of an exemplary block diagram of another multi-transport switch.

FIG. 11 illustrates an implementation of a multi-transport switch 1100 that is compatible with legacy systems. The multi-transport switch 1100 may be used to migrate existing networks towards a high-performance SONET/SDH or Ethernet-based network. The multi-transport switch 1100 comprises an SONET/SDH switch 1102, a virtual tributary (VT) switch 1104, a column switch 1106, and an Ethernet switch 1108, which may collectively be referred to as the switching fabric. In an embodiment, the SONET/SDH switch 1102 may be an existing STS-1 switching fabric, and may switch the TDM and HPF traffic. The VT switch 1104 may be a conventional VT switch 1104, and may switch VT structures. Persons of ordinary skill in the art will recognize that VT structures are used for organizing and transporting low rate sub-STS-1 synchronous signals. The column switch 1106 may switch the small granularity HPF traffic. The Ethernet switch

1108 may be any Ethernet switch that is suitable to switch the BEP data. The SONET/SDH switch 1102 and the Ethernet switch 1108 support both TDM data switching and packet switching in their native modes. While only one SONET/SDH switch 1102, one column switch 1106, and one Ethernet switch 1108 is illustrated, it is contemplated that the multi-transport switch 1100 may contain a plurality of SONET/SDH switches 1102, column switches 1106, and Ethernet switches 1108.

The multi-transport switch 1100 may also comprise a TDM line card 1110 and an Ethernet line card 1112. The TDM line card 1110 may exchange TDM data with the SONET/SDH switch 1102 over any appropriate telecommunications bus, such as a low voltage differential signaling (LVDS) bus. The Ethernet line card 1112 may exchange data with the SONET/SDH switch 1102 by encapsulating the data using any appropriate framing format. For example, Ethernet data may be encapsulated using the generic framing procedure (GFP) or the Link Access Procedure for SDH (LAPS).

The multi-transport switch 1100 may also comprise a plurality of H-TDM line cards 1114, 1116, 1118. The H-TDM line cards 1114, 1116, and 1118 may support both legacy Ethernet and SONET/SDH communications, as well as the operational modes described herein. Specifically, the H-TDM line card 1114 may exchange data with other line cards over 64B/66B encoded media using any appropriate protocol, such as 10G BASE-R Ethernet, 10G BASE-W Ethernet, SONET STS-192c, or SDH VC-4-64c. Persons of ordinary skill in the art will recognize that 10G BASE-W Ethernet encapsulates Ethernet data using the wide area network interface sublayer (WIS) into a format compatible with the SONET STS-192c transmission format or the SDH VC-4-64c container. The H-TDM line card 1116 may statistically multiplex up to about ten one-gigabit (1G) 8B/10B Ethernet interfaces by adding a tag at the ingress of the H-TDM line card 1116. Similarly, the H-TDM line card 1118 may statistically multiplex up to about four STS-48c or VC-4-16c interfaces by adding a tag at the ingress of the H-TDM line card 1118. The H-TDM line cards 1114, 1116, and 1118 may communicate the TDM, HPF, and BEP traffic to the SONET/SDH switch 1102 using the H-TDM synchronous timeslot scheme. The H-TDM line cards 1114, 1116, 1118 may be coupled to the SONET/SDH switch 1102 using any appropriate telecommunications bus, such as an LVDS bus. The H-TDM line cards 1114, 1116, 1118 may be coupled to the Ethernet switch 1108 using any applicable communications bus, such as a 10-gigabit attachment unit interface (XAUI) using 8B/10B signaling.

Figure 12:
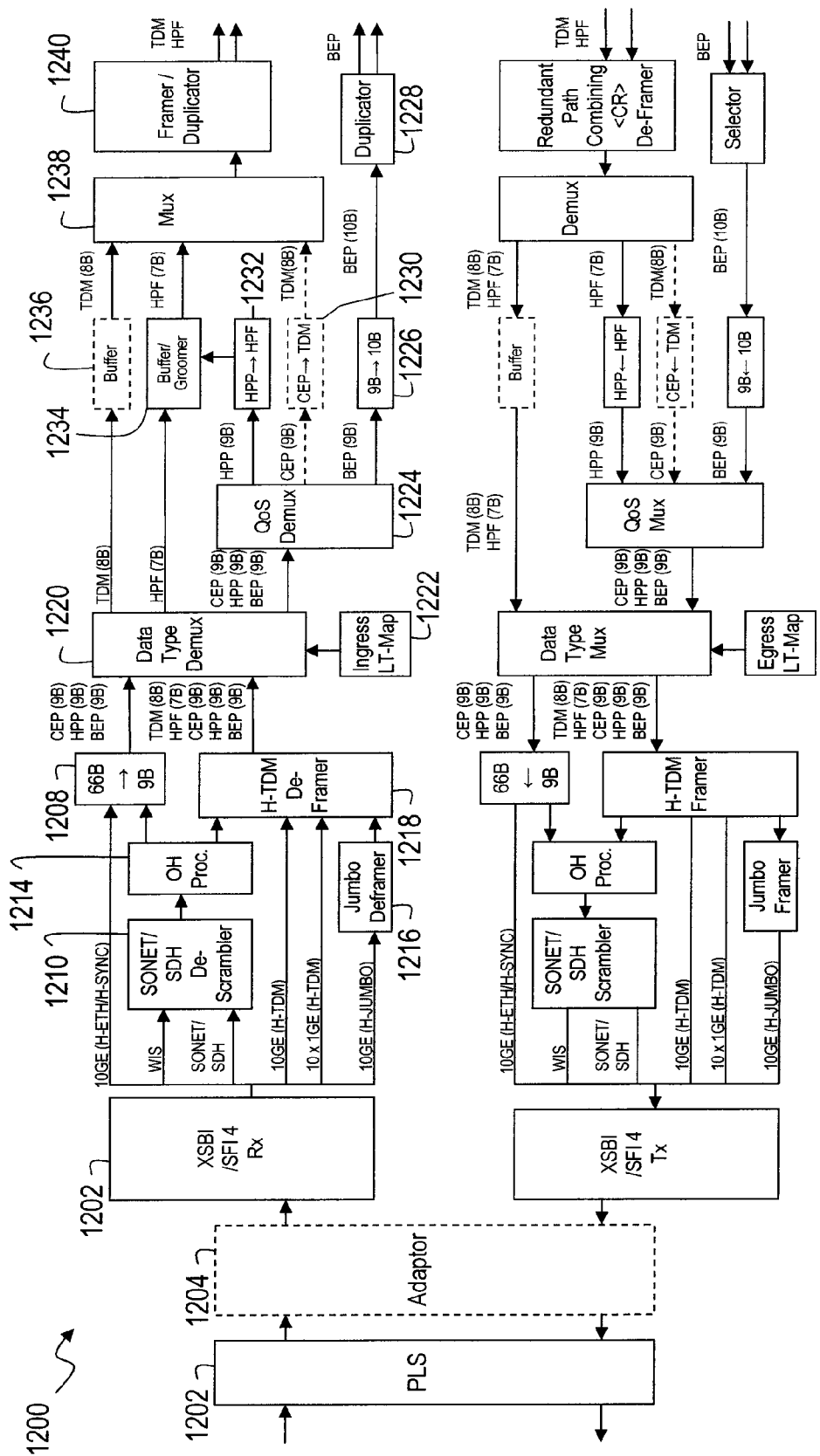
FIG. 12 is an illustration of an exemplary block diagram of a line card that is implemented on the multi-transport switch of FIG. 11.

FIG. 12 illustrates an exemplary functional block diagram of an H-TDM line card 1200 that may be one of the H-TDM line cards 1114, 1116, or 1118. The H-TDM line card 1200 may support both legacy communications and the operational modes described herein. The line card 1200 comprises a reception path, indicated by the left to right arrows on the upper half of the H-TDM line card 1200, and a transmission path, indicated by the right to left arrows on the lower half of the H-TDM line card 1200. Specifically, the reception path receives data from a communication interface (not shown), and transmits the data to the SONET/SDH switch and the Ethernet switch 1106 (shown in FIG. 11). Similarly, the transmission path receives data from the SONET/SDH switch and the Ethernet switch, and transmits the data to the communication interface.

Data on the reception path is received over the communication interface by physical layer circuits (PLS) 1202. As shown in line cards 1116 and 1118 in FIG. 11, the PLS 1202 may receive data over a plurality of different communication interfaces. The line card 1200 may optionally comprise an adaptor 1204 that supports statistical multiplexing of multiple interfaces as described above. As shown in FIG. 12 and described below, data from the PLS 1202 or the adaptor 1204 may be processed along one of a plurality of paths depending on the type and/or format of the data.

As shown at the top of the reception path, the data may be Ethernet packets communicated in accordance with 10G Ethernet or synchronized 10G Ethernet, such as through the H-SYNC operational mode, over an Ethernet, or SONET/SDH interface. When the Ethernet packets are received on the Ethernet interface, the Ethernet packets may be sent to a 64B/66B to 9B converter 1208. When the Ethernet packets are received on the SONET/SDH interface, the Ethernet packets may be encapsulated in a SONET/SDH frame in accordance with the WIS. As such, the SONET/SDH encapsulated Ethernet packets may be sent to a SONET/SDH descrambler 1210 and overhead processor 1214 to extract the Ethernet packets, which may then be sent to the 64B/66B to 9B converter 1208. The 64B/66B to 9B converter 1208 may then send the Ethernet packet data to a data type demultiplexer 1220, which is further described below.

The data received on the reception path may also comprise standard SONET/SDH frames or the H-TDM overlay synchronous timeslot scheme communicated over a SONET/SDH interface. Upon receiving a standard SONET/SDH frame, the frame may be sent to the SONET/SDH descrambler 1210 and overhead processor 1214 to extract the TDM data from the SONET/SDH frame. The overhead processor 1214 may send the TDM data to an H-TDM deframer 1218. Similarly, the H-TDM frames communicated over the SONET/SDH interface may also be sent to the SONET/SDH descrambler 1210, overhead processor 1214, and H-TDM deframer 1218.

The H-TDM overlay synchronous timeslot scheme may also be received over an Ethernet interface, over multiple Ethernet interfaces that are statistically multiplexed together, or in an encapsulated state within a plurality of Ethernet jumbo frames. Upon receiving the H-TDM overlay synchronous timeslot scheme over an Ethernet interface or multiple Ethernet interfaces, the H-TDM overlay synchronous timeslot scheme may be sent to the H-TDM deframer 1218. Upon receiving the H-TDM overlay synchronous timeslot scheme in a plurality of Ethernet jumbo frames, the Ethernet jumbo frames may be sent to a jumbo frame deframer 1216 that extracts the H-TDM overlay synchronous timeslot scheme. The jumbo frame deframer 1216 may then send the extracted H-TDM overlay synchronous timeslot scheme to the H-TDM deframer 1218. The H-TDM deframer 1218 may send the deframed timeslots to the data type demultiplexer 1220.

The data type demultiplexer 1220 may use a line card timeslot map (LT-Map) 1222 to separate the TDM, HPF, and packet data, and place the TDM, HPF, and packet data onto a TDM output, an HPF output, and a packet output, respectively. The data type demultiplexer 1220 may also output the packet data received from the 64B/66B to 9B converter 1208 to the packet output. As shown on the packet output, the packet data may comprise BEP data as well as high priority packet (HPP) data and circuit emulation packet (CEP) data. Persons of ordinary skill in the art will recognize that telephonic voice data may be carried in CEPs. Each of the different types of packet data may be distinguished using the optional tag octets. A QoS demultiplexer 1224 may separate the HPP and send the HPP to a converter 1232 that converts the HPP into a HPF. Similarly, the QoS demultiplexer 1224 may optionally separate the CEP and send the CEP to a converter 1230 that converts the CEP into TDM data, which may then be sent to a multiplexer 1238. The QoS demultiplexer 1224 may send 9B encoded BEP data to a 9B to 8B/10B converter 1226, which may convert the 9B encoded BEP data to 8B/10B encoded BEP data. The 8B/10B encoded BEP data may then be sent to a duplicator 1228 and output from the line card 1200 over an XAUI to the Ethernet switch 1108 shown in FIG. 11.

The data type demultiplexer 1220 may send the HPF data to a buffer/groomer 1234. The buffer/groomer 1234 may also receive HPF data converted by the converter 1232. The buffer/groomer 1234 may perform the buffering and data rate adaptation functions described below. The HPF data output from the buffer/groomer 1234 may be sent to the multiplexer 1238. The data type demultiplexer 1220 may output the TDM data to an optional buffer 1236 and then to the multiplexer 1238. The multiplexer 1238 may multiplex the TDM and HPF data and send the multiplexed data to the framer 1240. The framer 1240 may send the TDM and HPF data from the line card 1200 to the SONET/SDH switch 1102 shown in FIG. 11.

The transmission path may similarly perform all of the operations described above for the reception path, but in reverse. While the line card 1200 is shown as supporting all of the different operational modes, it is contemplated that less than all of the operational modes described above may be supported on the line card 1200. For example, only the H-TDM operational mode may be supported over a 10G Ethernet interface. In such a case, only the H-TDM deframer 1218 may need to be implemented on the reception path prior to the data type demultiplexer 1220.

Figure 13:
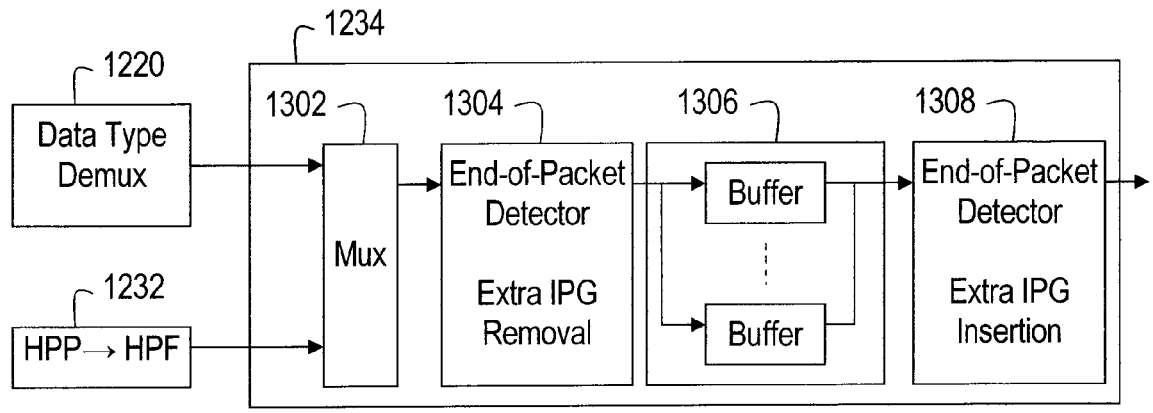
FIG. 13 is an illustration of an exemplary block diagram of a buffer/groomer.

FIG. 13 illustrates an exemplary implementation of the buffer/groomer 1234. Data rate adaptation for the HPF traffic is done in a similar fashion as for traditional Ethernet data, namely by adding octets to and removing octets from the IPG. The difference between an H-TDM link and a normal Ethernet link is that each HPF stream is transported and switched within a timeslot that has a fixed bandwidth. Consequently, rate adaptation for HPF traffic may be done on a per HPF flow basis.

The principle behind rate adaptation based on IPG size manipulation is that the packet flow, when originally created, must contain enough space in the IPG to allow for shrinkage of the IPG due to the worst-case frequency variations, without affecting the packet itself. The size of the IPG may be determined based on the size of the packet and the amount of frequency tolerance needed. The size of the IPG may also depend on the size of the packet because adjustment opportunities for data rate adaptation only occur between packets. Otherwise, data loss may occur when performing the data rate adaptation. In an embodiment, the IPG may vary in size from about two IPG octets to about twelve IPG octets.

There may be many methods for choosing the size of the IPG when converting HPP to HPF. One method is to determine the size of the IPG. Using a static determination, the size of the IPG may be determined using the largest packet size supported by the system. This method may result in easy and quick determinations of the IPG, but may also result in wasted bandwidth. Another method is to determine the size of the IPG dynamically. The determination of the size of the IPG may be performed dynamically by generating an IPG that is proportional to the size of the packet that preceded it.

As shown in FIG. 13, the buffer/groomer 1234 may receive HPF data from the data type demultiplexer 1220 or from the converter 1232. The HPF data may be multiplexed using multiplexer 1302 and sent to an end-of-packet detector and extra IPG remover 1304. Once a HPF has been generated from a HPP with the correct IPG, the IPG may only need to be adjusted to match the local frequency of the network on which it is being communicated. The IPG may be adjusted using a per flow HPF buffer 1306.

Both the HPF traffic received from the demultiplexer 1220 and the HPF traffic that may be generated by the converter 1232 may be stripped of extra IPGs by the end-of-packet detector and extra IPG remover 1304. The IPGs may be stripped by detecting the end of the HPF packet and removing all but one IPG octet. One IPG octet may remain between the HPF packets to identify the boundaries of HPF packets.

When received at the ingress of the line card, the HPF packets may be written in the same buffer 1306 that is used when converting HPP to HPF. During that process, BEP traffic that reuses the idle HPF timeslots may be removed, and only one idle IPG octet may be written between HPF and HPP packets. The rate adaptation may be performed while reading data from the buffer 1306. For traffic that was already in HPF form, additional idle octets may be inserted by an end-of-packet detector 1308 between HPF packets when the buffer fill is too low. For traffic that is being converted from HPP to HPF, an IPG with a size determined as described above may be inserted by the end-of-packet detector 1308.

As described, the rate adaptation for HPFs may be performed on the line card 1200 shown in FIG. 12. The HPF streams are then sent in dedicated STS synchronous payload envelopes to the SONET/SDH switch 1102 shown in FIG. 11. From there, small granularity HPF streams may further be sent to the column switch 1106 as described above. Since these HPF flows have already been frequency adapted, no further rate adaptation is required by the column switch. Consequently, the column switch 1106 implementation may be simpler because the column switch 1106 may synchronously switch all of the HPF traffic that it receives. The net result of HPF traffic data rate adaptation using IPG manipulation in a SDH/SONET environment is that when a SDH/SONET payload varies by ±one byte during certain high-order pointer adjustment procedures, the high-order pointer adjustment can be absorbed by the corresponding removal or insertion of IPG octets.

To guarantee the QoS of the HPF flows, per-flow queuing may be implemented using the buffer 1306 shown in FIG. 13. The per-flow queuing may be implemented at the ingress of a node for the Ethernet packets that have been identified as HPP. To provide the basis for a practical implementation, memory access requirements may be minimized. To accomplish this, the conversion from HPP to HPF should take place before the converted HPP packets are placed in the buffer 1306 because the HPF data is transferred on a 7B encoded timeslot basis. If the HPP packets are stored in a manner that crosses the boundaries of the 7B-encoded structure, multiple accesses to memory may be required, and the memory access requirements would increase.

As shown in FIG. 13, the buffer 1306 may comprise a bank of buffers, and may use one of a plurality of memory management methods. A first memory management method is to have a fixed assignment of dedicated buffers. Specifically, each HPF flow may be assigned at least one dedicated buffer to enable the per-flow queuing. The primary issue with this memory management method is that each buffer must be large enough to support the desired amount of statistical multiplexing required for the per-flow queuing because there is no reuse of buffers. Further, while no memory may be wasted when all HPFs are equipped and active, memory may be wasted when less than all of the HPFs are equipped and active.

In another memory management method, the buffers in the buffer 1306 may be statically reused. In this method, the buffers that correspond to unequipped HPFs may be distributed statically among the equipped HPFs. Individual buffers may be linked together using a Buffer Link Table (not shown) to form larger buffers using the statically distributed buffers. When a new HPF is equipped, the buffer chain may need to be broken in a timely manner without affecting the service state of the existing HPF flows and without excessive delays to put the new HPF in service. This memory management method may be an issue if the desired buffer is being actively used by an HPF with a slow data rate. The chain may also be reestablished without affecting the service state of the existing HPF flow.

In a further memory management method, the buffers in the buffer 1306 may be dynamically reused. In this method, the buffers that correspond to unequipped HPFs may be distributed dynamically among the equipped HPFs. Again, individual buffers may be linked together using a Buffer Link Table to form larger buffers using the dynamically distributed buffers. Buffers belonging to unequipped HPFs may be pooled together as a shared resource. When an HPF requires additional memory, it may be allocated at least one additional buffer from this shared resource. When an HPF does not require additional buffers anymore, it may release them back to the pool. The timely release of the shared buffer could be an issue if the HPF goes idle while using a shared buffer.

In a final memory management method, the buffers in the buffer 1306 may be dynamically assigned. In this method, all of the buffers in buffer 1306 may be dynamically distributed among the equipped HPFs. Individual buffers may be linked together using a Buffer Link Table to form larger buffers. HPF QoS may be guaranteed in one of at least three methods. A first method to guarantee QoS may be to assign a minimum quantity of buffers to each HPF using a sliding window method. That is, each time a HPF releases a buffer, it is assigned another buffer if the HPF is below its minimum quantity of buffers. A second method to guarantee QoS may be to assign a maximum number of buffers to each HPF. The sum of these maximum buffer numbers should not exceed the amount of buffers available. A third method to guarantee QoS may be to implement a combination of the first and second methods of guaranteeing QoS. When an HPF requires additional memory, it may be allocated at least one additional buffer from the non-assigned buffer pool. When the HPF does not require these additional buffers anymore, it releases them back to the pool. The third method may be advantageous in that the chain does not have to be closed. A virtual buffer may be created by continuously linking new physical buffers together.

Figure 14:
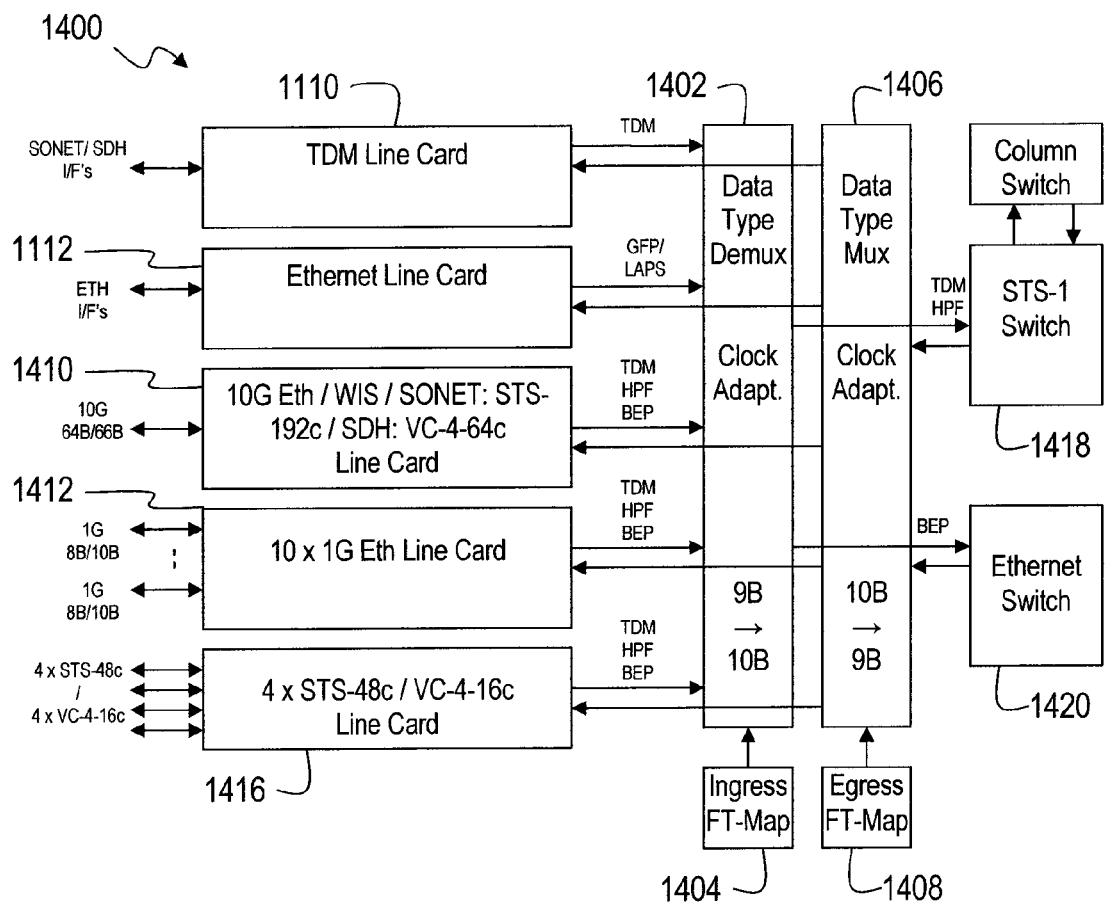
FIG. 14 is an illustration of an exemplary block diagram of a multi-transport switch.

FIG. 14 illustrates another embodiment of a multi-transport switch 1400 similar to the multi-transport switch 1100 described above. The multi-transport switch 1400 comprises a dual-mode switching fabric comprising a SONET/SDH switch 1418 and an Ethernet switch 1420. The multi-transport switch 1400 also comprises a plurality of backplane interconnects that maintain a pseudo-SONET/SDH architecture. The multi-transport switch 1400 supports TDM line card 1110 and the Ethernet line card 1112 described above, and the H-TDM line cards 1410, 1412, 1416, which are similar to the H-TDM line cards 1114, 1116, and 1118. However, the H-TDM line cards 1410, 1412, and 1416 differ from the H-TDM line cards 1114, 1116, and 1118 in that the H-TDM line cards 1114, 1116, and 1118 do not use the SONET/SDH switch 1418 to exchange TDM, HPF, and BEP data with the switching fabric.

The multi-transport switch 1400 also comprises a data type demultiplexer 1402 and a data type multiplexer 1406. The data type demultiplexer 1402 uses an ingress fabric timeslot map (FT-Map) 1404 to separate the HPF and TDM data from the BEP data. The HPF and TDM data may be sent to the SONET/SDH switch 1418, while the BEP data is sent to the Ethernet switch 1108. The BEP data may undergo clock domain adaptation before being sent to the Ethernet switch 1420 if the Ethernet switch 1420 operates at a different base frequency than the SONET/SDH switch 1418. After being switched by the SONET/SDH switch 1418 and Ethernet switch 1420, the HPF, TDM, and BEP data is sent to the data type multiplexer 1404, which uses an egress FT-Map 1408 to multiplex the TDM and HPF data with the BEP data. The data type multiplexer 1406 may perform clock domain adaptation on the BEP data. The data type multiplexer 1406 may then send the multiplexed TDM, HPF, and BEP data to one of the H-TDM line cards 1410, 1412, or 1414.

Figure 15:
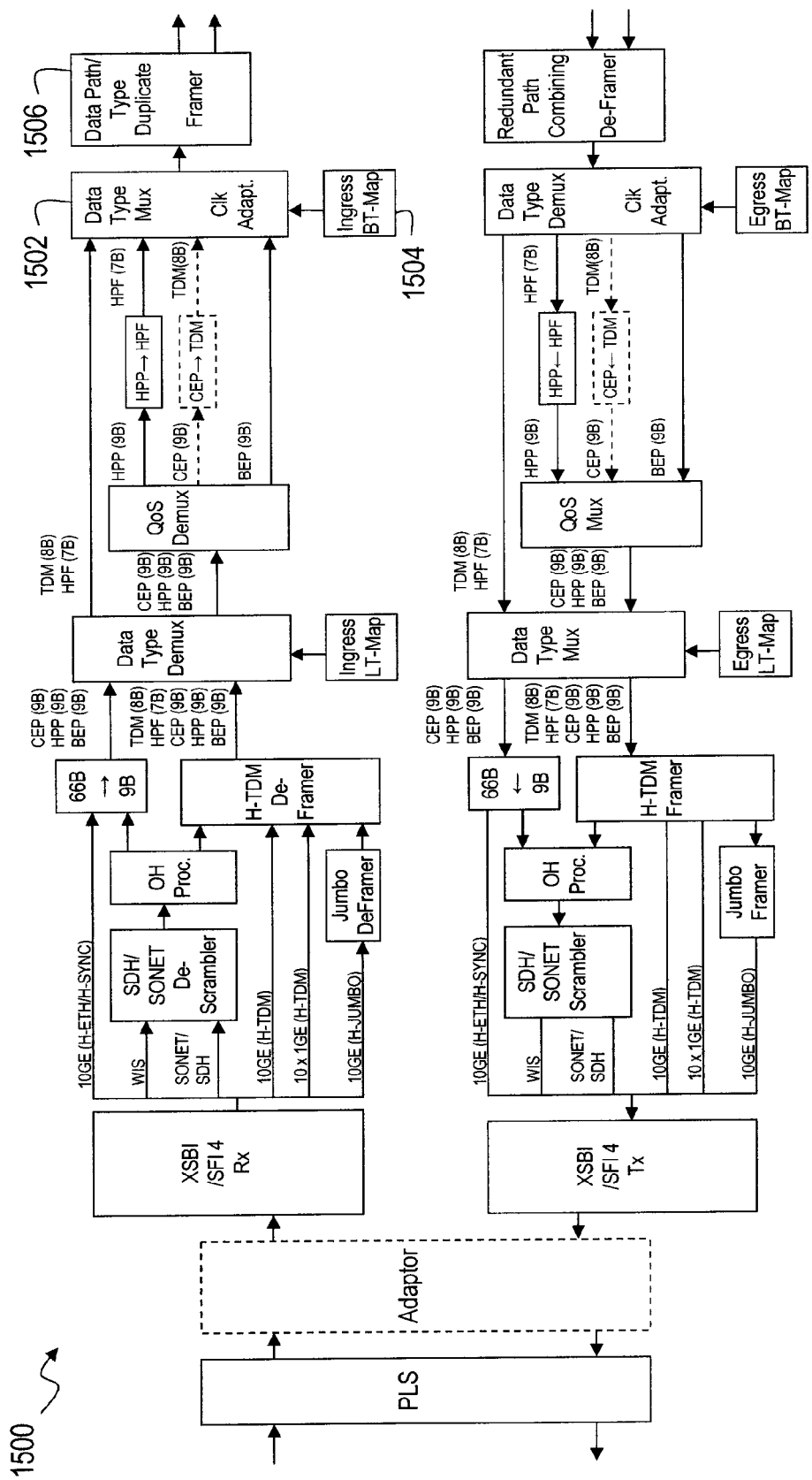
FIG. 15 is an illustration of an exemplary block diagram of a line card that is implemented on the multi-transport switch of FIG. 14.

FIG. 15 illustrates an exemplary functional block diagram of an H-TDM line card 1500 that may be one of the H-TDM line cards 1114, 1116, or 1118. The H-TDM line card 1500 may be structured and may operate similarly to the H-TDM line card 1200 described above. However, the H-TDM line card 1500 may differ from the H-TDM line card 1200 at the output of the reception path and the input of the transmission path. Specifically, rather than outputting the TDM and HPF data separately from the BEP data, the HPF, TDM, and BEP data may all be output together on a common reception path. In such an embodiment, a data type multiplexer 1502 may use an ingress backplane timeslot map (BT-Map) 1504 to multiplex the TDM, HPF, and BEP data together. The multiplexed data may then be sent to a data path/type duplicator and framer 1506 and communicated to the data type demultiplexer 1402 shown in FIG. 14. The data type multiplexer 1502 may also perform clock domain adaptation to adapt the Ethernet line interface data rates to the data rates of the telecommunication bus connecting the line card 1500 to the data type demultiplexer 1402. As with the line card shown in FIG. 12, the transmission path may similarly perform all of the operations described above for the reception path, but in reverse.

Figure 16:
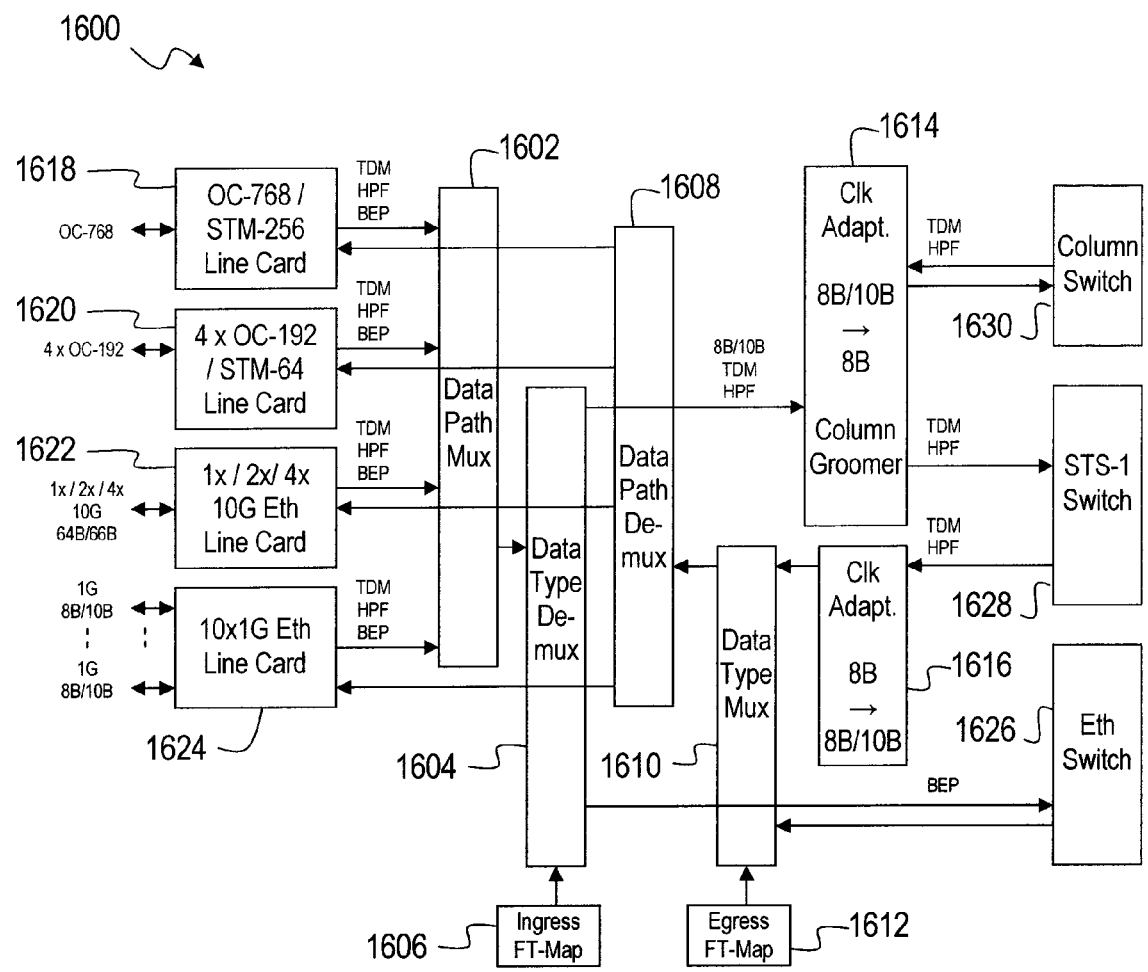
FIG. 16 is an illustration of an exemplary block diagram of another multi-transport switch.

FIG. 16 illustrates an exemplary multi-transport switch 1600 that supports the switching of the H-TDM overlay synchronous timeslot scheme. The multi-transport switch 1600 is similar to the multi-transport switch 1400 described above, except there is no support for legacy Ethernet or SONET/SDH line cards. In addition, the TDM, HPF, and BEP data may be sent to the switching fabric over XAUI interfaces using 8B/10B encoding. The multi-transport switch 1600 is centered on a dual-mode switch fabric similar to that described above. The dual-mode switch fabric supports TDM and HPF switching via a SONET/SDH switch 1628 and BEP switching via an Ethernet switch 1626.

The multi-transport switch 1600 has a switching fabric that comprises a data path multiplexer 1602, a data type demultiplexer 1604, a data path demultiplexer 1608, and a data type multiplexer 1610. The data path multiplexer 1602 multiplexes the 8B/10B encoded TDM, HPF, and BEP data from a plurality of H-TDM line cards 1618, 1620, 1622, and 1624. The multiplexed data may then be sent to the data type demultiplexer 1604, which separates the 8B/10B encoded TDM and HPF data from the BEP data using an ingress FT-Map 1606. The BEP data may then be sent to the standard Ethernet switch 1626, while TDM and HPF data may be sent to a clock adaptor and column groomer 1614. The clock adaptor and column groomer 1614 may convert the TDM and HPF data from the 8B/10B encoding scheme to the 8B encoding scheme. Further, the clock adaptor and column groomer 1614 may work in conjunction with a column switch 1630 and the SONET/SDH switch 1628 to switch of HPF and VT-based TDM traffic.

The multi-transport switch also comprises a clock adaptor 1616 that converts the 8B encoded TDM and HPF data received from the SONET/SDH switch 1628 into 8B/10B encoded TDM and HPF data. The 8B/10B encoded TDM and HPF data may be sent to the data type multiplexer 1610 along with BEP data received from the Ethernet switch. The data type multiplexer 1610 uses an Egress FT-Map 1612 to multiplex the TDM, HPF, and BEP data together in accordance with the H-TDM overlay synchronous timeslot scheme. The multiplexed TDM, HPF, and BEP data may then be sent to the data path demultiplexer 1608, where it is then distributed to the H-TDM line cards 1618, 1620, 1622, and 1624.

Figure 17:
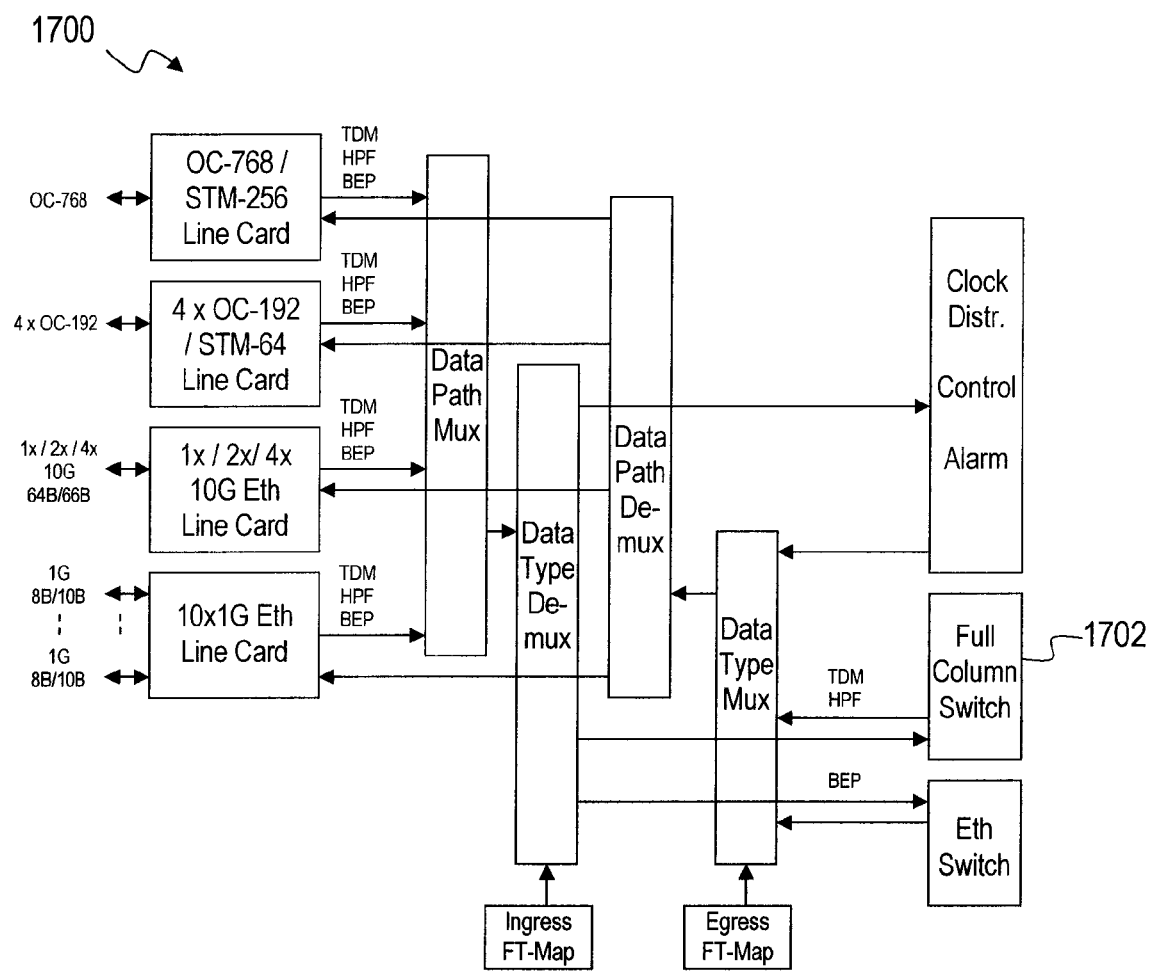
FIG. 17 is an illustration of an exemplary block diagram of another multi-transport switch.

FIG. 17 illustrates an exemplary multi-transport switch 1700 that switches on the H-TDM overlay synchronous timeslot scheme. The multi-transport switch 1700 is similar to the multi-transport switch 1600 described above, except that the multi-transport switch 1700 switches the TDM and HPF data using a full column switch 1702. The full column switch prevents the HPF flows from being blocked and eliminates grooming complexities. The SONET/SDH overhead processing functions may be performed on SONET/SDH line cards coupled to the multi-transport switch 1700, thereby minimizing the amount of legacy functionality that has to be implemented in the multi-transport switch 1700 to support traditional TDM traffic. Some exemplary implementations of the H-TDM line cards 1618, 1620, 1622, and 1624 follow.

Figure 18:
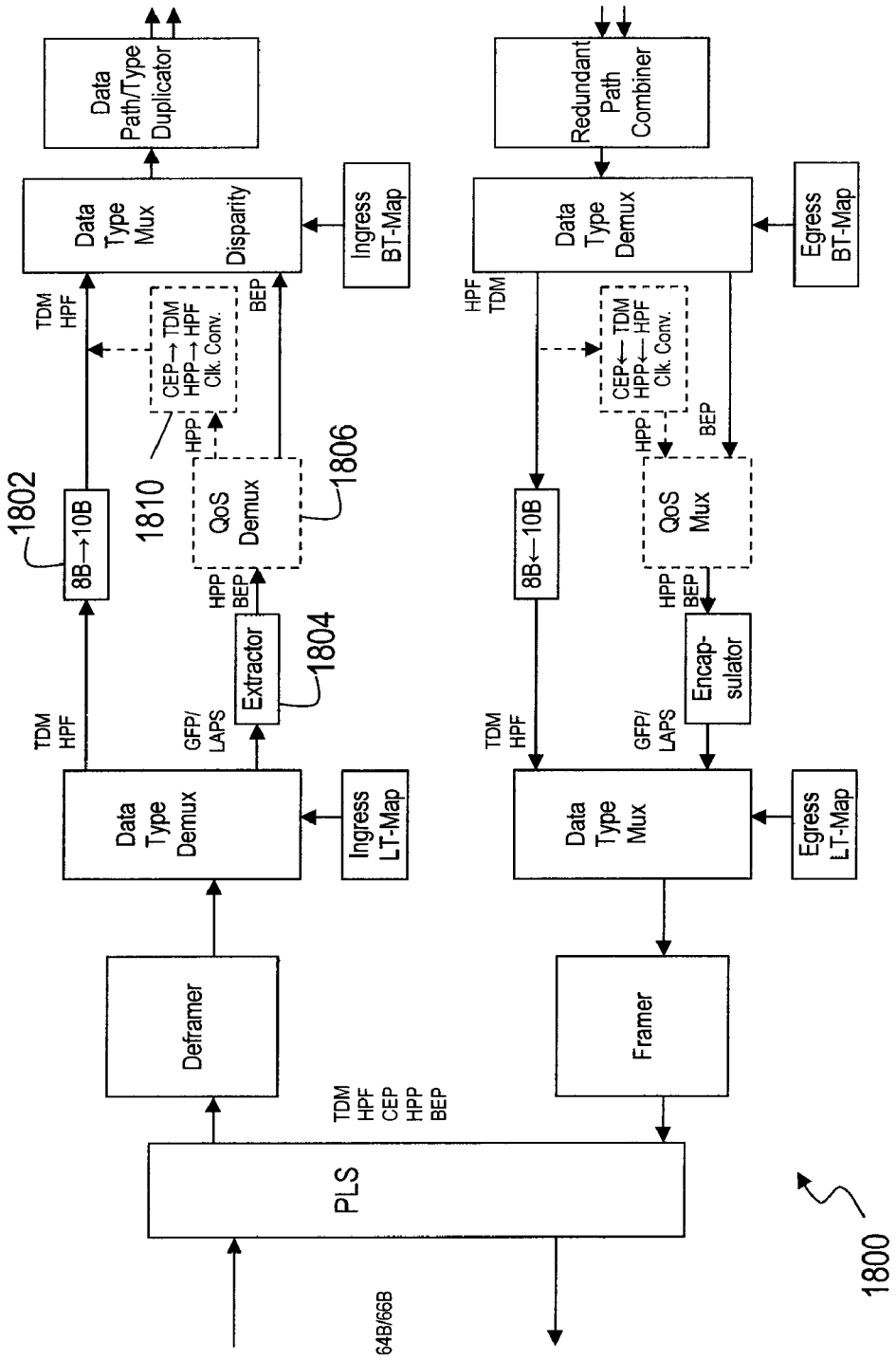
FIG. 18 is an illustration of an exemplary block diagram of a line card that is implemented by the multi-transport switches of FIG. 16 or 17.

FIG. 18 illustrates an exemplary functional block diagram of the H-TDM line card 1800, which may be the H-TDM line cards 1618 and 1620 described above. The H-TDM line cards 1800 may be structured similar to the H-TDM line cards described above, but may receive data over a SONET/SDH interface. The H-TDM line card 1800 may differ from the H-TDM line cards describe above in that the HPF and TDM data are encoded using the 8B/10B encoding scheme. Specifically, the 8B encoded TDM data and the 7B encoded HPF data are converted to the 8B/10B (10B) encoding scheme using a converter 1802 on the reception path. Further, the H-TDM line card 1800 comprises an extractor 1804 that extracts packet data that has been encapsulated in a SONET/SDH frame in accordance with GFP/LAPS and transported over the SONET/SDH interface. This packet data may comprise low priority BEP packet data and high priority packet data. The H-TDM line card 1800 may optionally comprise a QoS demultiplexer 1806 that separates the low priority BEP data from the high priority packet data. The high priority packet data may then be converted into TDM or HPF data using a converter 1810. The transmission path may similarly be modified.

Figure 19:
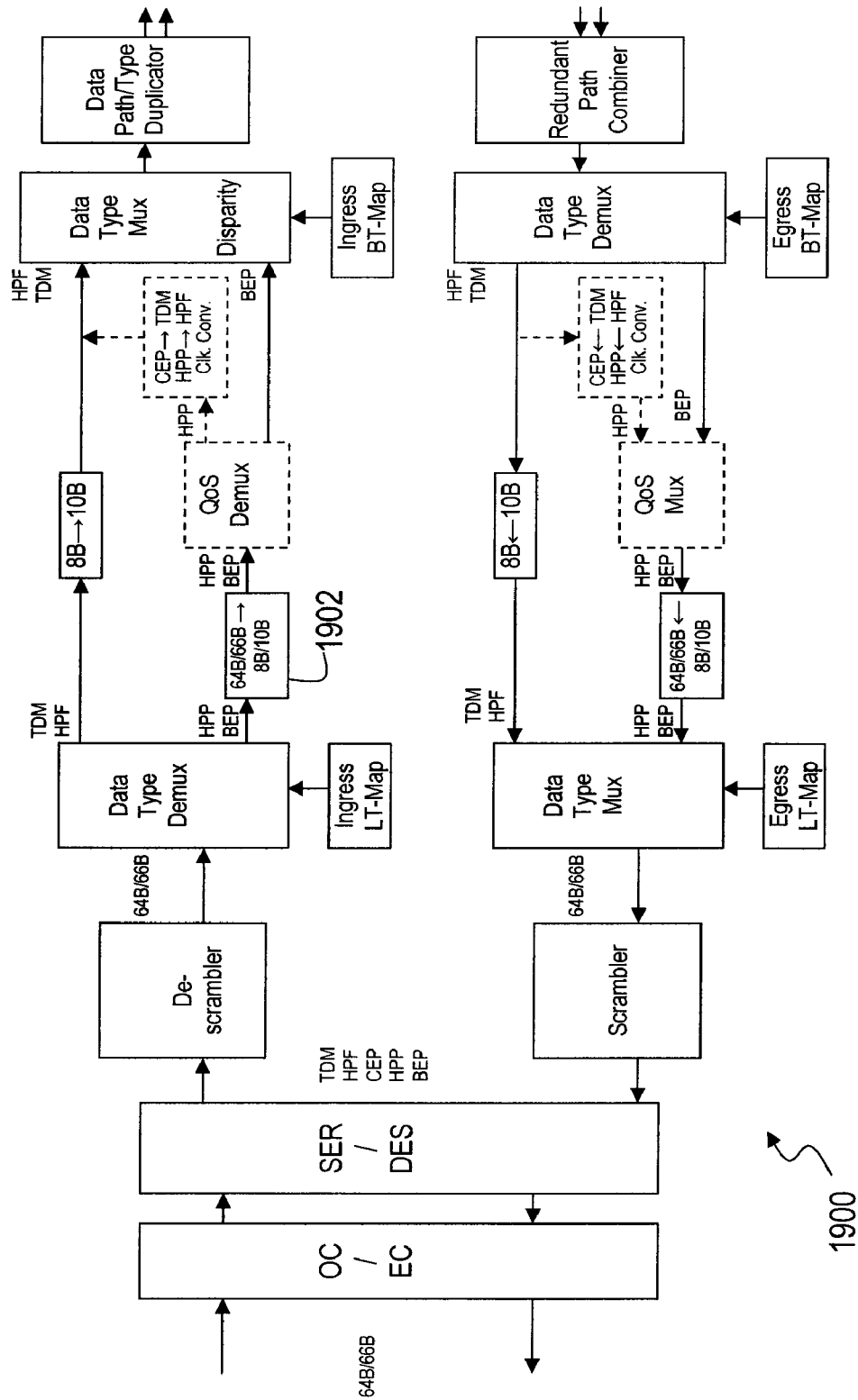
FIG. 19 is an illustration of an exemplary block diagram of another line card that is implemented by the multi-transport switches of FIG. 16 or 17.

FIG. 19 illustrates an exemplary functional block diagram of the H-TDM line card 1900, which may be the H-TDM line card 1622 described above. The H-TDM line card 1900 may be structured similar to the H-TDM line cards 1618 and 1620 described above, but may receive data over a 10G Ethernet interface. The H-TDM line card 1622 differs from the H-TDM line cards described above in that the extractor is replaced by a converter 1902. The converter 1902 converts the 64B/66B encoded Ethernet data into 8B/10B encoded Ethernet data. A similar converter also exists on the transmission path.

Figure 20:
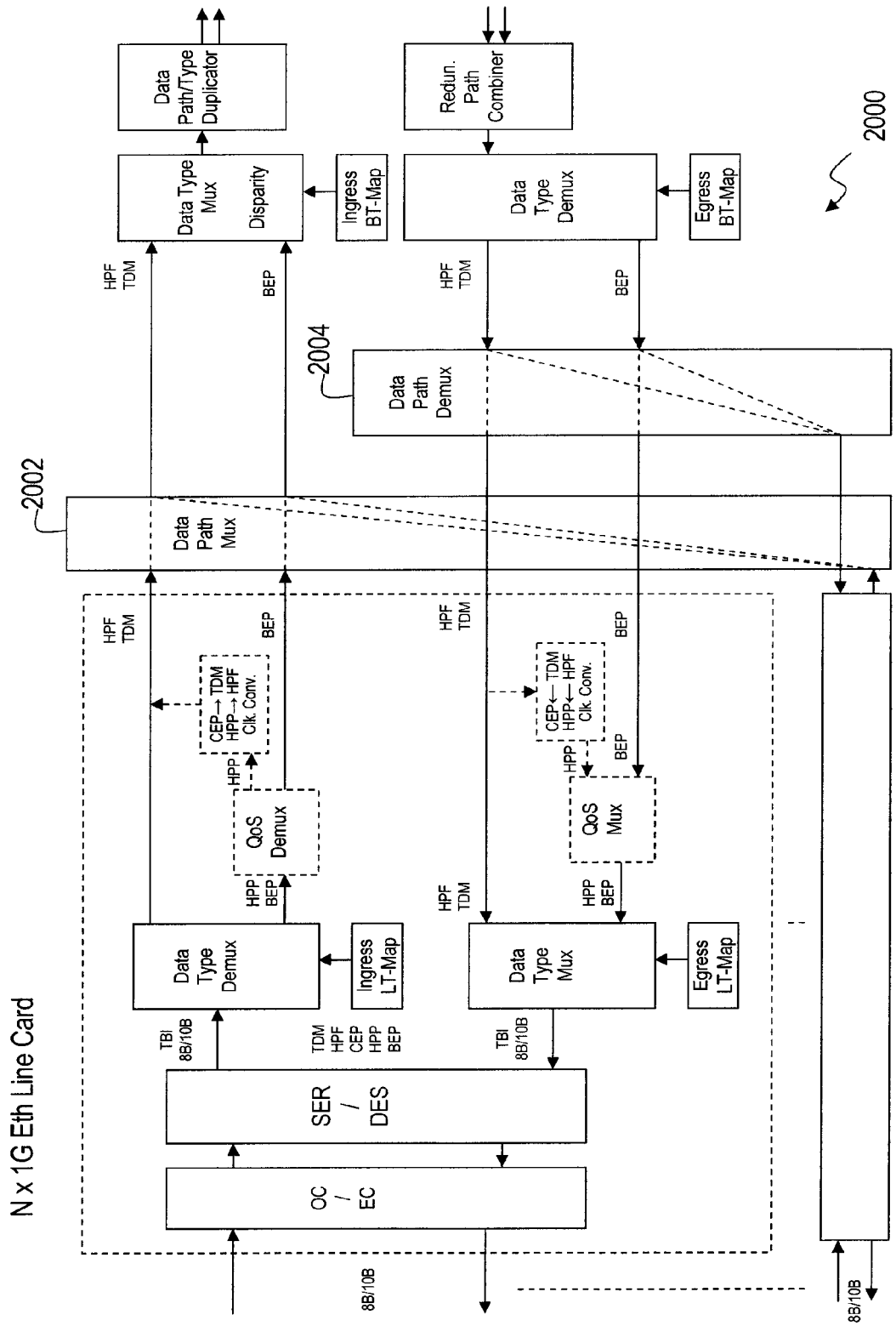
FIG. 20 is an illustration of an exemplary block diagram of another line card that is implemented by the multi-transport switches of FIG. 16 or 17.

FIG. 20 illustrates an exemplary functional block diagram of the H-TDM line card 2000, which may be the H-TDM line card 1624 described above. The H-TDM line card 2000 may be structured similar to the H-TDM line cards 1618 and 1620 described above, but may receive data over a plurality of Ethernet interfaces. The H-TDM line card 2000 differs from these H-TDM line cards in that the plurality of Ethernet interfaces all feed into a data path multiplexer 2002 before being communicated to the switching fabric of the multi-transport switch. Similarly, the H-TDM line card 2000 comprises a data path demultiplexer 2004 that separates data received from the switching fabric of the multi-transport switch and communicates the data over the plurality of Ethernet interfaces.

Figure 21:
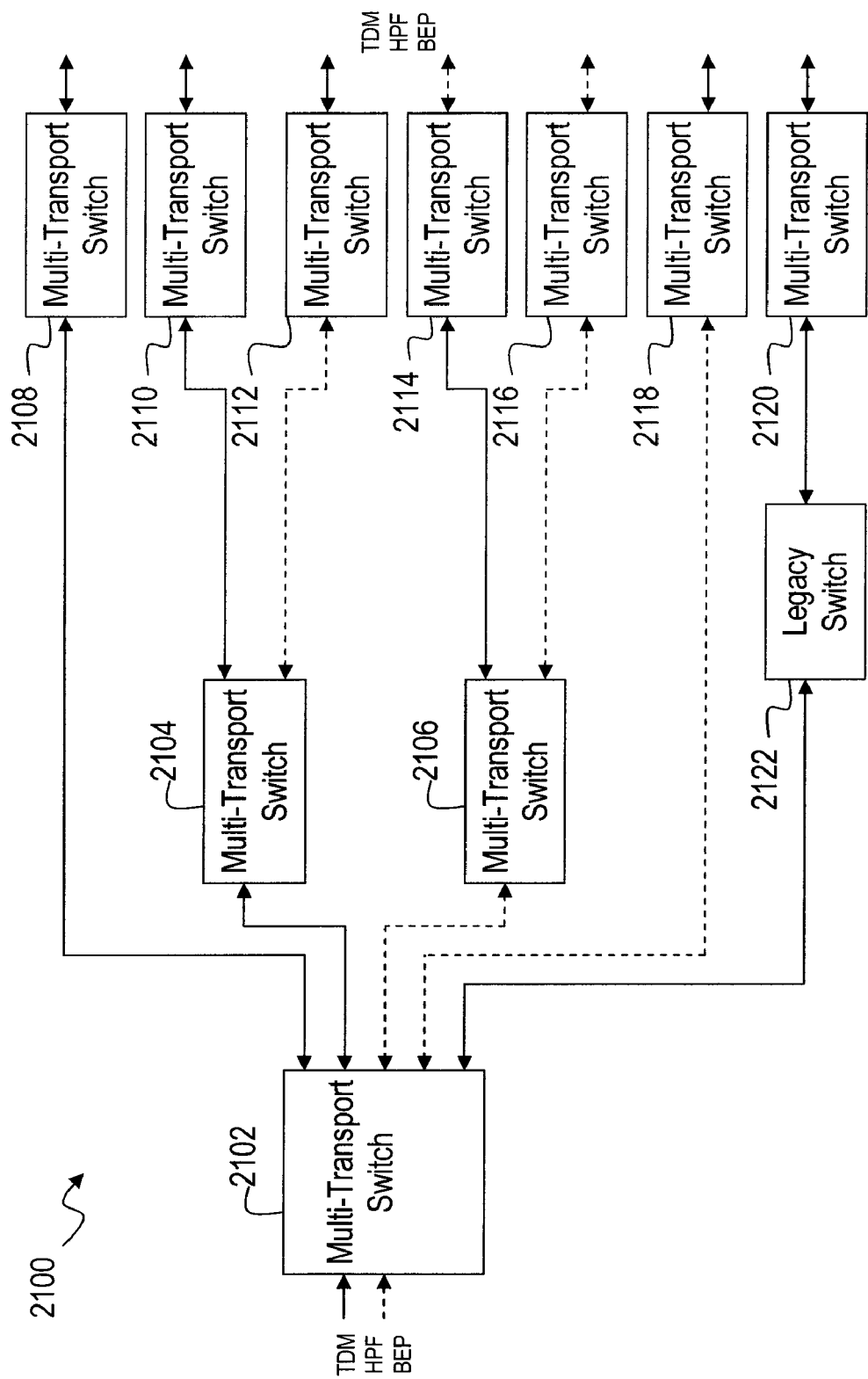
FIG. 21 is an illustration of an exemplary unified network.

FIG. 21 illustrates an exemplary unified network 2100 that may transport TDM and packet data over SONET/SDH and Ethernet interfaces. The unified network 2100 comprises a legacy switch 2122 and a plurality of multi-transport switches 2102, 2104, 2106, 2108, 2110, 2112, 2114, 2116, 2118, 2120 (collectively, 2102-2120), which may be the multi-transport switches described herein. As such, the multi-transport switches 2102-2120 may communicate with each other and the legacy switch 2122 using an Ethernet, SONET, or SDH protocol, or the H-SYNC, H-TDM, or H-JUMBO operational modes described above.

In the specific embodiment shown in FIG. 21, the solid lines may represent Ethernet links and the dashed lines may represent a SONET/SDH links. The communications links are shown with arrows pointing in both directions to represent bi-directional full-duplex communication. In an embodiment, at least some of the multi-transport switches 2102-2120 and/or the legacy switch 2122 may support half-duplex communication. The interface between the links and the multi-transport switches 2102-2120 may represent the interface between a physical communication medium and the line cards on the multi-transport switches 2102-2120. For example, the interface of the solid line with that of the multi-transport switches 2102-2120 may represent an Ethernet line card that sends and receives data over the Ethernet link. As shown in FIG. 21, the multi-transport switches 2102-2120 are depicted with at least two links, thus the multi-transport switches 2102-2120 may contain at least two line cards. In an embodiment, at least one of the multi-transport switches 2102-2120 may implement a single line card with multiple ports. The multi-transport switches 2102-2120 may utilize at least one of the line cards depicted in FIGS. 12-20 and/or at least one of legacy SONET/SDH or Ethernet line cards.

Some of the multi-transport switches 2102-2120 may support the mapping of TDM, HPF, and BEP data from the Ethernet links to the SONET/SDH links, or vice versa. For example, the multi-transport switch 2102 may receive data over the Ethernet link and map the data to SONET so that the data may be transported over the SONET/SDH link to the multi-transport switch 2118. The data may be mapped between protocols and/or operational modes multiple times when traversing the unified network 2100. For example, the multi-transport switch 2102 may send data over the Ethernet link to the multi-transport switch 2104, which may then map the data to SONET so that the data may be transported over the SONET/SDH link to the multi-transport switch 2112. The multi-transport switch 2112 may then map the data back to Ethernet so that the data may be transported over another Ethernet link.

The multi-transport switches 2102-2120 may also support communication with the legacy switch 2122. For example, the legacy switch 2122 may be a legacy Ethernet switch, and the multi-transport switch 2102 may communicate with the legacy switch 2122 over an Ethernet link using a standard Ethernet protocol or the H-SYNC or H-JUMBO operational modes. Alternatively, the legacy switch 2122 may be a legacy SONET/SDH switch and the multi-transport switch 2102 may communicate with the legacy switch 2122 over a SONET/SDH link. In such a case, the multi-transport switch 2102 may communicate TDM and HPF data using the H-TDM operational mode, or the multi-transport switch 2102 may communicate packet data using standard Ethernet communications or the H-SYNC operational mode using the WIS. While only one legacy switch 2122 is shown, it is contemplated that the unified network 2100 may comprise a plurality of legacy switches 2122 distributed throughout the unified network 2100.

The unified network 2100 may be used as a backbone network, an access network, or any other network or portion of a network. As such, the unified network 2100 may have some of the multi-transport switches 2102-2120 on the edge of the network and some of the multi-transport switches 2102-2120 within the core of the network. The multi-transport switches 2102-2120 within the core of the network may communicate with other multi-transport switches 2102-2120 or other legacy switches 2122 to facilitate data transport across the network.

The multi-transport switches 2102-2120 may communicate with various devices that need to send and receive data, such as service providers and service users. For example, the multi-transport switches 2108, 2110, 2112, 2114, 2116, 2118, 2120 (collectively, 2108-2120) may also be on the edge of the network, and the multi-transport switches 2104, 2106, 2112 may be at the core. The multi-transport switch 2102 may receive TDM, HPF, and BEP data over the Ethernet link and/or the SONET/SDH link from at least one data source, which may be a service provider or any other data originator. The multi-transport switches 2108-2120 may send data to the data user, which may be a service user.

Recall that the H-TDM and the H-SYNC operational modes enable synchronized communication. Further, while the H-SYNC operational mode may enable frequency-synchronized communication, the H-TDM operational mode enables both frequency-synchronized and phase-aligned communication. Specifically, the synchronization windows on two or more of the multi-transport switches 2102-2120, delineated by the internal synchronization signal described above, may have the same period, and thus may be frequency-synchronized. The internal synchronization signal may happen at the same time on two or more of the multi-transport switches 2102-2120, such that the synchronization windows on two or more of the multi-transport switches 2102-2120 occur during the same absolute time, referred to as phase-alignment. In an embodiment, the multi-transport switches 2102-2120 may be frequency-synchronized and phase-aligned when implementing the H-TDM operational mode.

The H-TDM operational mode may frequency-synchronize and phase-align the multi-transport switches 2102-2120 by calculating and adjusting for the communication delay between the multi-transport switches 2102-2120. As shown in FIG. 21, there are intervening nodes between some of the multi-transport switches 2102-2120. For example, multi-transport switch 2104 is an intervening node between the multi-transport switch 2102 and the multi-transport switch 2110. On the other hand, there are no intervening nodes between the multi-transport switch 2102 and the multi-transport switch 2108. Further, some intervening nodes may be legacy switches, such as the legacy Ethernet switch 2122, and some may be multi-transport switches, such as multi-transport switch 2104. As such, with the varying numbers and types of intervening nodes along the communication pathways between the multi-transport switches 2102-2120 there may be differing delays along each communication pathway.

In some instances, it may be desirable to communicate synchronously between the multi-transport switch 2102 and two or more of the multi-transport switches 2108-2118 using the H-TDM operational mode. Specifically, the H-TDM operational mode allows the multi-transport switches 2108-2118 to establish at least one synchronous communication pathway. For example, the multi-transport switch 2102 may be configured to receive multimedia content from a multimedia distributor, which may be multicast over a plurality of communication pathways to the two or more of the multi-transport switches 2108-2118. The multi-transport switches 2108-2118 may then distribute the multimedia content to a plurality of subscribers. By taking into account the different delays along the communication pathways, the multi-transport switch 2102 may compensate for the delay along each communication pathway such that the multimedia content may arrive substantially simultaneously at each of the two or more multi-transport switches 2108-2118. This may be desirable when synchronizing the playback of multimedia content between several multimedia content subscribers, or having a conference call between a plurality of remote parties.

While the above example was directed to the distribution and playback of multimedia content, persons of ordinary skill in the art will recognize that the delayed distribution and synchronized reception of data at different locations may be used with any data type. Further, while the above example was directed to distributing data from one source to a plurality of locations, persons of ordinary skill in the art will appreciate that multiple data sources may have their data synchronously received at a single location. For example, each musician in a band may be remotely located while having a recording session at a remote recording studio. In this example, the music produced by each musician may be synchronized together to be recorded at the remote recording studio. Many other applications that have already been envisioned and have yet to be envisioned are enabled through synchronized communication in the unified network 2100.

Figure 22:
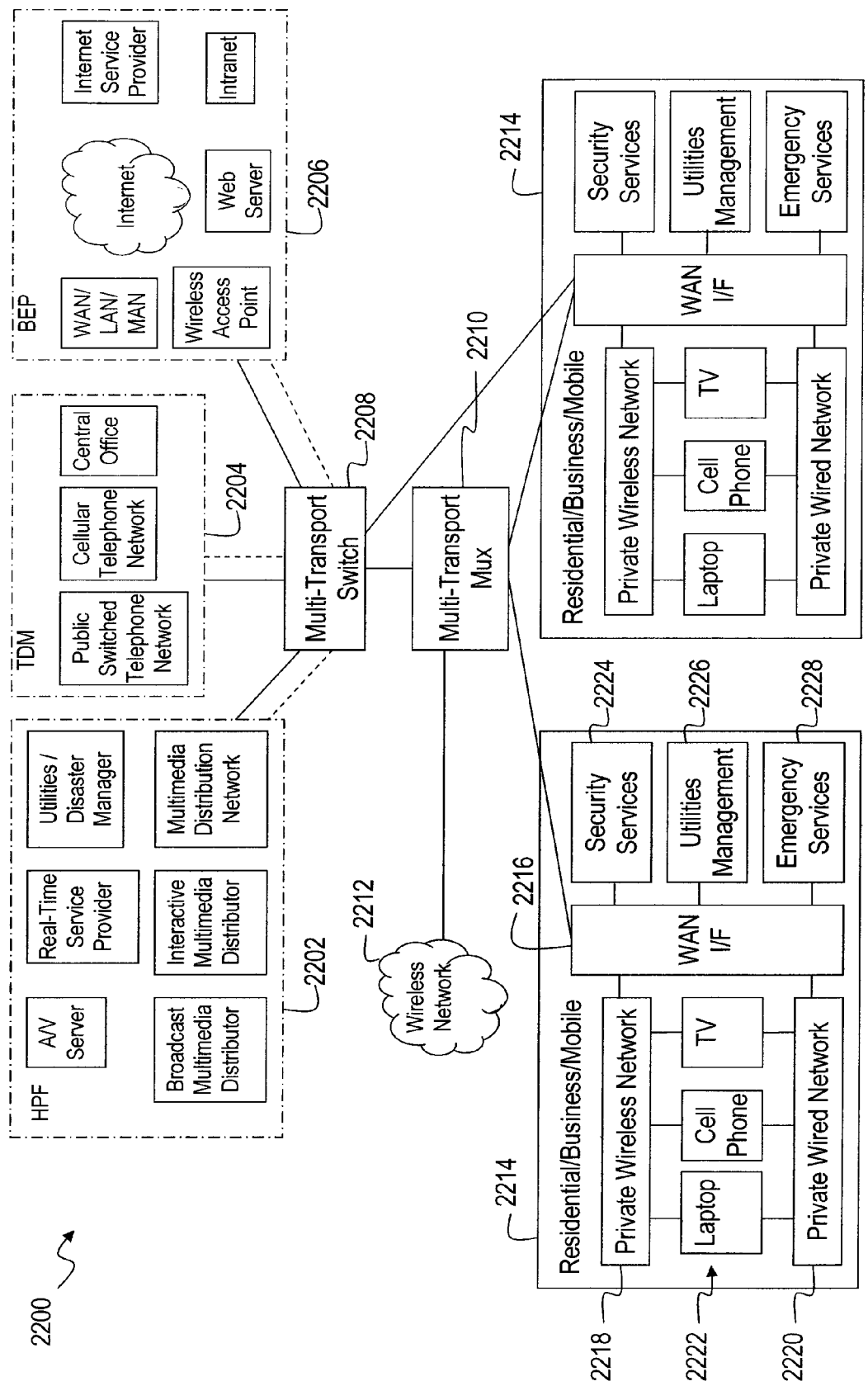
FIG. 22 is an illustration of an exemplary network architecture.

FIG. 22 illustrates an exemplary network architecture 2200 for communicating TDM, HPF, and BEP data. The network architecture 2200 comprises a plurality of service providers or data producers 2202, 2204, 2206 (collectively, 2202-2206), at least one multi-transport switch 2208 that may act as a backbone network, at least one multi-transport multiplexer 2210 that may act as an access network, and a plurality of service users or data consumers 2214. The data producers 2202-2206 may be HPF data producers 2202, TDM data producers 2204, and/or BEP data producers 2206. Persons of ordinary skill in the art will recognize that each of the data producers 2202-2206 may also receive data, such as requests for data or services or back channel information from consumer devices. The HPF data producers 2202 may comprise an audio/video (A/V) server, a broadcast multimedia distributor, an interactive multimedia distributor, a multimedia distribution network, a real-time service provider, and a utilities/disaster manager. The TDM data producers 2204 may comprise the public switched telephone network (PSTN), a central office coupled to the PSTN, or a cellular telephone network. The BEP data producers 2206 may comprise a wide area network (WAN), a local area network (LAN), a metro area network (MAN), an intranet, the internet, an internet service provider, a wireless access point, or a web server.

While some examples of the data producers 2202-2206 are described above, these are merely exemplary lists and do not exhaustively describe all of the data producers 2202-2206. Further, while each of the data producers described above is categorized by the data type they produce, it is contemplated that some data producers may be categorized under two or more data types. For example, an interactive multimedia distributor may transmit multimedia data as BEP data in situations when a multimedia presentation is not intended for immediate playback, but is rather downloaded to a consumer device, such as a set top box, to be played back later. The same interactive multimedia distributor may also transmit HPF data when the multimedia data is meant to be viewed substantially in real-time.

The backbone network of the network architecture 2200, including at least one multi-transport switch 2208, may be coupled to each of the data producers 2202-2206 through at least one Ethernet or SONET/SDH link. Similar to the unified network 2100 in FIG. 21, the solid lines represent Ethernet links and the dashed lines represent SONET/SDH links. For example, the multi-transport switch 2208 may be coupled to the AN server though an Ethernet link, and may be coupled to a central office or the PSTN through a SONET/SDH link. The multi-transport switch 2208 may be coupled to the TDM-based networks without a media gateway because the multi-transport switch 2208 may be able to communicate TDM data in its native mode over both SONET/SDH interfaces and Ethernet interfaces. As such, the TDM data does not need to be buffered, encapsulated, or otherwise modified prior to communication by the multi-transport switch 2208. The multi-transport switch 2208 may be one of the multi-transport switches described above. Further, the multi-transport switch 2208 may comprise a plurality of multi-transport switches arranged as the unified network described above. As such, the multi-transport switch 2208 may communicate the TDM, HPF, and BEP data over the backbone network to the multi-transport multiplexer 2210, or directly to the data consumers 2214.

As mentioned above, the multi-transport multiplexer 2210 may act as an access network in the network architecture 2200. As such, the multi-transport multiplexer 2210 may provide the "last mile" communication to the data consumers 2214. For example, the multi-transport multiplexer 2210 may communicate with the data consumers 2214 via an Ethernet link, or using other conventional "last mile" technologies such as communicating over a wireless network 2212, a twisted wire pair, a coaxial cable, a passive optical network, or fiber-to-home. In an embodiment, the multi-transport multiplexer 2210 may be part of or used in conjunction with an access provider.

The data consumers 2214 may be any residential, business, or mobile device customer or service user. Persons of ordinary skill in the art will recognize that the data consumers 2214 may also produce data such as documents, spreadsheets, pictures, movies, and other data that may be sent to other data consumers 2214 and/or the data producers 2202-2206. The data consumers may comprise a WAN interface 2216 that communicates with a plurality of consumer networks and devices. Specifically, the consumer networks and devices may comprise a private wireless network 2218, a private wired network 2220, and a plurality of consumer devices 2222, such as a laptop computer, a cellular telephone, and a television. Further, the WAN interface 2216 may enable communication with locally implemented services at the consumer's location, such as security services 2224, utilizes management 2226, and emergency services 2228.

Figure 23:
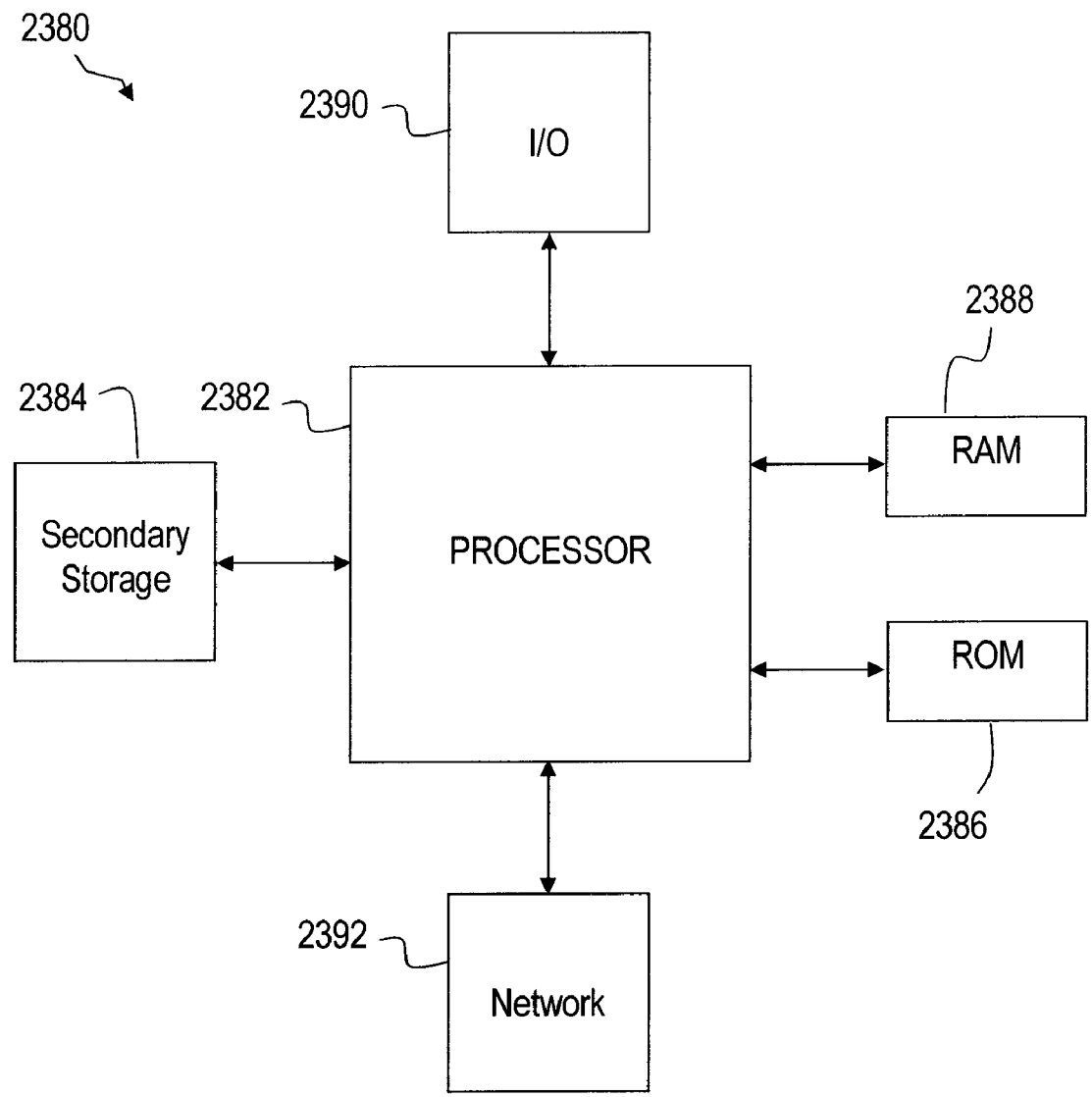
FIG. 23 is an illustration of one embodiment of a general-purpose computer system suitable for implementing the several embodiments of the disclosure.

The system described above may be implemented on any general-purpose computer with sufficient processing power, memory resources, and network throughput capability to handle the necessary workload placed upon it. FIG. 23 illustrates a typical, general-purpose computer system suitable for implementing at least one embodiment disclosed herein. The computer system 2380 comprises a processor 2382 (which may be referred to as a central processor unit or CPU) that may be in communication with memory devices including secondary storage 2384, read only memory (ROM) 2386, random access memory (RAM) 2388, input/output (I/O) devices 2390, and network connectivity devices 2392. The processor 2382 may be at least one CPU chip.

The secondary storage 2384 may typically be comprised of at least one disk drive or tape drive and may be used for non-volatile storage of data and as an over-flow data storage device if RAM 2388 is not large enough to hold all working data. Secondary storage 2384 may be used to store programs which are loaded into RAM 2388 when such programs are selected for execution. The ROM 2386 may be used to store instructions and perhaps data which are read during program execution. ROM 2386 may be a non-volatile memory device which typically has a small memory capacity relative to the larger memory capacity of secondary storage 2384. The RAM 2388 may be used to store volatile data and perhaps to store instructions. Access to both ROM 2386 and RAM 2388 is typically faster than to secondary storage 2384.

I/O devices 2390 may comprise printers, video monitors, liquid crystal displays (LCDs), touch screen displays, keyboards, keypads, switches, dials, mice, track balls, voice recognizers, card readers, paper tape readers, or other well-known input devices. The network connectivity devices 2392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 2392 may enable the processor 2382 to communicate with an Internet or at least one intranet. With such a network connection, it is contemplated that the processor 2382 might receive information from the network, or might output information to the network in the course of performing the above-described method steps. Such information, which is often represented as a sequence of instructions to be executed using processor 2382, may be received from and outputted to the network, for example, in the form of a computer data signal embodied in a carrier wave.

Such information, which may comprise data or instructions to be executed using processor 2382, for example, may be received from and outputted to the network, for example, in the form of a computer data baseband signal or signal embodied in a carrier wave. The baseband signal or signal embodied in the carrier wave generated by the network connectivity devices 2392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to persons of ordinary skill in the art.

The processor 2382 executes instructions, codes, computer programs, scripts which it accesses from hard disk, floppy disk, optical disk (these various disk based systems may all be considered secondary storage 2384), ROM 2386, RAM 2388, or the network connectivity devices 2392.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. In addition, persons of ordinary skill in the art will appreciate that the term octet as used herein is synonymous with the term byte, and that the octets described herein do not necessarily have to contain eight bits.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by persons of ordinary skill in the art and could be made without departing from the spirit and scope disclosed herein.

What is claimed is:

1. A network comprising:
    a first line card configured to send a data stream via an Ethernet interface, wherein the data stream comprises an Ethernet packet data and a time division multiplexed (TDM) data;
    a second line card configured to receive the data stream via the Ethernet interface;
    a third line card configured to send the data stream via a SONET/SDH interface; and
    a fourth line card configured to receive the data stream via the SONET/SDH interface,
    wherein the first line card, the second line card, the third line card, and the fourth line card are synchronized to an absolute time.

2. The network of claim 1, wherein the second line card and the fourth line card are phase-aligned.

3. The network of claim 1, further comprising:
    a fifth line card configured to receive the data stream from the second line card via the Ethernet interface and send the data stream via a second SONET/SDH interface;
    a switch configured to receive the data stream from the fifth line card via the second SONET/SDH interface, process the data stream, and send the data stream via a third SONET/SDH interface; and
    a sixth line card configured to receive the data stream from the switch via the third SONET/SDH interface and send the data stream via a second Ethernet interface,
    wherein the fifth line card, the switch, and the sixth line card, are located between the first line card and the second line card.

4. The network of claim 3, further comprising:
    a seventh line card configured to receive the data stream from the switch via a fourth SONET/SDH Ethernet interface; and
    an eighth line card configured to receive the data stream from the seventh line card via fifth SONET/SDH interface,
    wherein the seventh line card is located between the switch and the eighth line card,
    wherein the eighth line card is synchronized to an absolute time, and
    wherein the reception of the data stream at the second line card, the fourth line card, the sixth line card and the eighth line card are phase-aligned.

5. The network of claim 1, wherein the data stream further comprises high priority flow data and at least one idle bit subsequent to the high priority flow, wherein a quantity of idle bits is adjusted according to a size of a SONET/SDH payload.

6. The network of claim 1, wherein the Ethernet packet data comprises a best effort packet (BEP) data and a high performance flow (HPF) data.

7. The network of claim 6, wherein the first line card, the second line card, the third line card, and the fourth line card each comprise a data type multiplexer, wherein the data type multiplexer multiplexes the Ethernet packet data and the TDM data on a common data path.

8. The network of claim 7, wherein the data type multiplexer maps the location of the BEP data, the HPF data, and the TDM data using a timeslot map.

9. The network of claim 8, wherein the timeslot map is transmitted with the multiplexed data.

10. The network of claim 7, wherein the data type multiplexer is configured to perform clock domain adaptation.

11. A method comprising:
    sending, by a first line card, a data stream via an Ethernet interface, wherein the data stream comprises an Ethernet packet data and a time division multiplexed data;
    receiving, by a second line card, the data stream via the Ethernet interface;
    sending, by a third line card, the data stream via a SONET/SDH interface; and
    receiving, by a fourth line card, the data stream via the SONET/SDH interface,
    synchronizing the first line card, the second line card, the third line card, and the fourth line card to an absolute time.

12. The method of claim 11, further comprising:
    phase-aligning the second line card and the fourth line card.

13. The method of claim 11, further comprising:
    receiving, by a fifth line card, the data stream from the second line card via the Ethernet interface;
    sending, by the fifth line card, the data stream via a second SONET/SDH interface;
    receiving, by a switch, the data stream from the fifth line card via the second SONET/SDH interface;
    process, by the switch, the data stream;
    sending the processed data stream via a third SONET/SDH interface; and
    receiving, by a sixth line card, the data stream from the switch via the third SONET/SDH interface; and
    sending the data stream via a second Ethernet interface,
    wherein the fifth line card, the switch, and the sixth line card, are located between the first line card and the second line card.

14. The method of claim 13, further comprising:
    receiving, by a seventh line card, the data stream from the switch via a fourth SONET/SDH Ethernet interface;
    receiving, by an eighth line card, the data stream from the seventh line card via a fifth SONET/SDH interface;
    synchronizing the eighth line card to an absolute time; and
    phase-aligning the reception of the data stream at the second line card, the fourth line card, the sixth line card and the eighth line card,
    wherein the seventh line card is located between the switch and the eighth line card.

15. The method of claim 11, further comprising:
    adjusting a quantity of idle bits according to a size of a SONET/SDH payload, wherein the data stream further comprises high priority flow data and at least one of the idle bits subsequent to the high priority flow.

16. The method of claim 11, wherein the Ethernet packet data comprises a best effort packet (BEP) data and a high performance flow (HPF) data.

17. The method of claim 16, further comprising multiplexing, by a data type multiplexer, the Ethernet packet data and the TDM data on a common data path,
wherein the first line card, the second line card, the third line card, and the fourth line card each comprise a data type multiplexer.

18. The method of claim 17, further comprising:
mapping, by the data type multiplexer, the location of the BEP data, the HPF data, and the TDM data using a timeslot map.

19. The method of claim 18, further comprising:
transmitting the timeslot map with the multiplexed data.

20. The method of claim 17, further comprising:
performing, by the data type multiplexer, clock domain adaptation.

* * * * *